United States Patent
Chen et al.

(10) Patent No.: US 8,243,590 B2
(45) Date of Patent: Aug. 14, 2012

(54) METHOD AND SYSTEM FOR SEAMLESS DUAL SWITCHING IN A PORT BYPASS CONTROLLER

(75) Inventors: Chung-Jue Chen, Irvine, CA (US); Ali Ghiasi, Cupertino, CA (US); Jay Proano, Rancho Santa Margarita, CA (US); Rajesh Satapathy, Lake Forest, CA (US); Steve Thomas, Riverside, CA (US)

(73) Assignee: Broadcom Corporation, Irvine, CA (US)

( * ) Notice: Subject to any disclaimer, the term of this patent is extended or adjusted under 35 U.S.C. 154(b) by 2954 days.

(21) Appl. No.: 10/779,234

(22) Filed: Feb. 13, 2004

(65) Prior Publication Data

US 2005/0131988 A1 Jun. 16, 2005

Related U.S. Application Data

(60) Provisional application No. 60/529,200, filed on Dec. 12, 2003, provisional application No. 60/529,145, filed on Dec. 12, 2003, provisional application No. 60/529,143, filed on Dec. 12, 2003, provisional application No. 60/529,421, filed on Dec. 12, 2003.

(51) Int. Cl.
*H04J 1/16* (2006.01)
(52) U.S. Cl. ......... 370/222; 370/221; 370/223; 370/224
(58) Field of Classification Search .................. 370/222, 370/223, 224, 405, 406, 221, 229, 252, 258, 370/363, 368, 360; 714/4.2
See application file for complete search history.

(56) References Cited

U.S. PATENT DOCUMENTS

| | | | | |
|---|---|---|---|---|
| 5,524,109 A | * | 6/1996 | Smith et al. | 370/517 |
| 5,991,891 A | * | 11/1999 | Hahn et al. | 714/4.21 |
| 6,055,228 A | * | 4/2000 | DeKoning et al. | 370/258 |
| 6,550,029 B1 | * | 4/2003 | Bailey et al. | 714/724 |
| 6,961,767 B2 | * | 11/2005 | Coffey et al. | 709/224 |
| 7,280,485 B2 | * | 10/2007 | Suenaga | 370/241 |
| 2002/0046276 A1 | * | 4/2002 | Coffey et al. | 709/224 |
| 2002/0118685 A1 | * | 8/2002 | Linnell et al. | 370/400 |
| 2002/0191537 A1 | | 12/2002 | Suenaga | |

(Continued)

OTHER PUBLICATIONS

Website: http://www.highbeam.com , PMC-Sierra Introduces Fibre Channel Port Bypass Controller Product Family Enabling Intelligent and Low Cost SAN Equipment Design, From: Business Wire, Date: Apr. 14, 2003, 2 pages.

(Continued)

*Primary Examiner* — Chi Pham
*Assistant Examiner* — Abdullah Riyami
(74) *Attorney, Agent, or Firm* — Thomas, Kayden, Horstemeyer & Risley, LLP

(57) ABSTRACT

Certain aspects of the invention for seamless port bypass controller operations for storage systems, for example, and may comprise a first port of a port bypass controller that receives an input signal and at least one of a plurality of selectors that selects at least a second port coupled in a chain to the first port. At least one of the selectors may switch at least a portion of the received input signal from the first port to at least the second port without initializing or reconfiguring the second port. A repeater may repeat at least a portion of the received input signal to the second port without initializing or reconfiguring the second port. A retimer may generate a retimed signal corresponding to at least a portion of the received input signal to the second port without initializing or reconfiguring the second port.

30 Claims, 15 Drawing Sheets

U.S. PATENT DOCUMENTS

| | | | |
|---|---|---|---|
| 2003/0031163 A1* | 2/2003 | Cashman et al. | 370/351 |
| 2003/0108058 A1* | 6/2003 | Black et al. | 370/403 |
| 2004/0062509 A1* | 4/2004 | Peeke | 385/135 |
| 2004/0076113 A1* | 4/2004 | Aronson et al. | 370/217 |
| 2004/0081186 A1 | 4/2004 | Warren et al. | |
| 2004/0184721 A1* | 9/2004 | Birmingham | 385/24 |
| 2005/0132258 A1* | 6/2005 | Chen et al. | 714/704 |
| 2006/0010336 A1* | 1/2006 | Hopkins et al. | 714/4 |
| 2006/0083511 A1* | 4/2006 | Edmunds et al. | 398/25 |

OTHER PUBLICATIONS

Website: http//www.elecdesign.com/Articles/Print.cfm?ArticleID=4215, FC Port Bypass Controller Elevates SAN Equipment, Date: Oct. 20, 2006, 1 page.

PMC-Sierra, 4-Port FC/GE Retimer and FC-AL Port Bypass Controller, PMC-2021698 Issue 2, 2 pages, 2003.

PMC-Sierra, 18-Port Intelligent FC-AL Port Bypass Controller, PMC-2020722, Issue 5, 2 pages, 2004.

* cited by examiner

METHOD AND SYSTEM FOR SEAMLESS DUAL SWITCHING IN A PORT BYPASS CONTROLLER

CROSS-REFERENCE TO RELATED APPLICATIONS/INCORPORATION BY REFERENCE

This application makes reference to, claims priority to, and claims the benefit of:

U.S. Provisional Application Ser. No. 60/529,200 filed Dec. 12, 2003;
U.S. Provisional Application Ser. No. 60/529,145 filed Dec. 12, 2003;
U.S. Provisional Application Ser. No. 60/529,143 filed Dec. 12, 2003; and
U.S. Provisional Application Ser. No. 60/529,421 filed Dec. 12, 2003.

This application also makes reference to:
U.S. application Ser. No. 10/779,001 filed Feb. 13, 2004;
U.S. application Ser. No. 10/779,232 filed Feb. 13, 2004;
U.S. application Ser. No. 10/779,233 filed Feb. 13, 2004;
U.S. Provisional Application Ser. No. 10/767,729 filed Jan. 30, 2004; and
U.S. Provisional Application Ser. No. 10/767,748 filed Jan. 30, 2004.

The above stated applications are hereby incorporated herein by reference in their entirety.

FIELD OF THE INVENTION

Certain embodiments of the invention relate to port bypass controllers. More specifically, certain embodiments of the invention relate to a method and system for seamless dual switching in a port bypass controller.

BACKGROUND OF THE INVENTION

FIG. 1a is a block diagram 120 of a conventional networking environment illustrating the arrangements of various communication and storage entities. Referring to FIG. 1a, there is shown a wide area network (WAN) 110 comprising a plurality of local area networks (LANs) 102, 104, 106, 108 and a router 132. The LANs 102, 104, 106, 108 are coupled via the router 132. The LAN 102 comprises PCs 112, 116, 120, servers 126, 128 and data storage elements 114, 118, 122, 124 and 130.

The data storage element 114 may be coupled to the PC 112, the data storage element 118 may be coupled to the PC 116 and the data storage element 122 may be coupled to the PC 120. The data storage element 124 may be coupled to the server 126 and the data storage element 130 may be coupled to the server 128. The LANs 104, 106, 108 may also comprise a plurality of PCs, data storage elements and servers which may be configured in a somewhat similar manner as in LAN 102.

In operation, the PCs 112, 116, 120 may communicate with each other and with the servers 126, 128 via the LAN 102. The PCs 112, 116, 120 may communicate with communication entities coupled to the LANs 104, 106, 108 via the router 132. Additionally, the communication entities coupled to the LANs 104, 106, 108 may also communicate with the PCs 112, 116, 120, servers 126, 128, and the data storage elements 114, 118, 122, 124, 130 via the router 132.

A major drawback with the configuration of the conventional networking environment of FIG. 1a is that the bandwidth of the PC's connection or link to the LAN and the server's connection or link to the LAN may severely affect the performance of a communication network. Furthermore, the processing bandwidth of the PC's and the servers may further decrease system performance by introducing delays, which results in increased system latency. For example, it may be desirable for PC 112 to communicate with PC 120 in order to acquire information from the data storage element 122. Accordingly, if the network connections coupling the PC 112 and the PC 120 are slow, then these connections will limit communication between PC 112 and PC 120. Performance of the communication between PC 112 and PC 120 may be further limited or degraded in cases where the processing bandwidth for the PC 112 and PC 120 are low. Furthermore, during operation, multiple PCs may be attempting to communicate with the PC 120 in order to acquire information from the data storage element 120 while the PC 112 is simultaneously communicating with the PC 120. In this regard, as the number of communication entities attempting to acquire information from the data storage element 122 increases, the limited processing bandwidth and communication bandwidth of the PC 112 and the PC 120 may result in further delays and increased latency. The PCs 112, 116, 120, therefore, become bottlenecks.

In another example, it may be desirable for PC 120 to communicate with server 126 in order to acquire information from the data storage element 124. Accordingly, if the network connections coupling the PC 120 and the server 126 are slow, then these connections will limit communication between PC 120 and server 126. Performance of the communication between PC 120 and server 126 may be further limited or degraded in cases where the processing bandwidth for the PC 120 and server 126 are low. Furthermore, during operation, multiple PCs such as PCs 112, 116 may be attempting to communicate with the server 126 in order to acquire information from the data storage element 124, while the PC 120 is simultaneously communicating with the server 126. In this regard, as the number of communication entities attempting to acquire information from the data storage element 124 via the server 126 increases, the limited processing bandwidth and communication bandwidth of the PC 120 and the server 126 may result in further delays and increased latency. Although the bandwidth of the connections of the PCs and servers to the LAN may be increased by adding higher bandwidth connections, this can be a costly venture. Similarly, the processing bandwidth may also be increased by adding faster processors but the cost may be prohibitive.

FIG. 1b is a block diagram 130 of an improved conventional networking environment illustrating the arrangements of various communication and storage entities, which addresses some of the drawbacks of the networking environment of FIG. 1a. Referring to FIG. 1b, there is shown a wide area network (WAN) 110 comprising a plurality of local area networks (LANs) 102, 104, 106, 108 and a router 132. The LANs 102, 104, 106, 108 are coupled via the router 132. The LAN 102 comprises PCs 112, 116, 120, servers 126, 128 and data storage elements 132 and 134.

The data storage element 134 may comprise a plurality of storage devices such as a disk array, which may be coupled to the server 126. The data storage element 136 may also comprise a plurality of storage devices such as a disk array, which may be coupled to the server 128. The LANs 104, 106, 108 may also comprise a plurality of PCs, data storage elements and servers which may be configured in a somewhat similar manner as in LAN 102.

During operation, the PCs 112, 116, 120 may communicate with each other and with the servers 126, 128 via the LAN 102. The PCs 112, 116, 120 may also communicate with communication entities coupled to the LANs 104, 106, 108 via the router 132. Additionally, the communication entities coupled to the LANs 104, 106, 108 may also communicate with the PCs 112, 116, 120, servers 126, 128, and the data storage elements 134, 136.

When compared to the networking environment of FIG. 1*a*, the servers 126, 128 may be configured so that they have much greater communication and processing bandwidth than the PCs 112, 116 and 120. Notwithstanding, although the networking environment configuration of FIG. 1*b* may provide better performance than the networking environment of FIG. 1*a*, one drawback with the configuration of FIG. 1*b* is that the servers 126, 128 are now bottlenecks. In this regard, as the number of connections to the servers requesting information from the data storage entities 134, 136 increases, the servers themselves will become bottlenecks resulting in degradation of system performance. For example, in instances when the PCs 112, 116, 120 and other networking communication entities coupled to the LANs 104, 106, 108 simultaneously acquire information from the servers 126 and/or 128, some connections may be blocked since the servers 126 and/or 128 may not have the capacity to handle all the connections.

FIG. 1*c* is a block diagram 140 of an improved conventional networking environment illustrating the arrangements of various communication and storage entities, which addresses some of the drawbacks of the networking environment of FIG. 1*a* and FIG. 1*b*. Referring to FIG. 1*c*, there is shown a wide area network (WAN) 110 comprising a plurality of local area networks (LANs) 102, 104, 106, 108, a router 132 and a storage area network (SAN) 142. The LANs 102, 104, 106, 108 are coupled via the router 132. The LAN 102 comprises PCs 112, 116, 120 and servers 126, 128. The storage area network 142 comprises data storage elements 144, 146 and 148.

The data storage elements 144, 146, 148 may comprise a plurality of storage devices such as disk arrays, which may be coupled to the servers 126, 128 via the storage access network 142. Each of the LANs 104, 106, 108 may also comprise a plurality of PCs and servers which may be configured in a somewhat similar manner as in LAN 102. One or more servers coupled to the LANs 104, 106, 108 may also be coupled to the storage area network 142 or may communicate with data storage elements 144, 146, 148 via the storage area network 148. Since any of the LANs 102, 104, 106, 108 may communicate directly or indirectly with the storage area network 142, information stored in the data storage elements 144, 146, 148 may be more readily accessible without encountering the bottlenecks previously associated with the networking environments of FIG. 1*a* and FIG. 1*b*.

FIG. 2 is a block diagram of an exemplary local area network (LAN) coupled to a storage area network (SAN). Referring to FIG. 2, there is shown LANs 202, 204, 206, 208 and storage access network (SAN) 240. The LAN 202 may comprise PCs 210, 212, 214, and servers 216, 218. The storage area network 240 may comprise a fibre channel (FC) switch 224, file servers (FSs) 226, 228, 230 and a plurality of data storage elements 232, 234, 236. Each of the data storage elements 232, 234, 236 may comprise a plurality of fibre channel hard disks.

The storage access network 240 may be coupled to the LAN 202 via host bus adapters (HBAs) 220, 222, which interface with the servers. In this regard, the host bus adapter 220 may be configured to interface with the fibre channel switch 224 and the server 216, and the host bus adapter 222 may be configured to interface with the fibre channel switch 224 and the server 218. The file server 226 may be coupled to the data storage element 232, the file server 228 may be coupled to the data storage element 234 and the file server 230 may be coupled to the data storage element 236.

The file servers 216, 218 may comprise a plurality of ports, to which a data storage device, such as a hard disk, may be coupled. Each of the file server's plurality of ports may be electrically and/or optically coupled to a single storage element, such as a hard disk. In this regard, each of the file servers' 226, 228, 230 supports a single point-to-point connection with a particular hard disk.

The fibre channel switch 224 may be adapted to switch connections between servers and the file servers. For example, the fibre channel switch 224 may be adapted to switch connections from the server 216 to any of the file servers 226, 228, 230 in order to provide access to the data storage elements 232, 234, 236, respectively. Similarly, the fibre channel switch 224 may be adapted to switch connections from the server 216 to any of the file servers 226, 228, 230 in order to provide access to any one or more of the data storage elements 232, 234, 236, respectively.

In operation, the PC 214 may utilize any of the servers 216, 218 to retrieve information from any of the file servers 232, 234, 236. In a case where PC 214 establishes a connection with server 216 in order to retrieve information from the file server 230, then the fibre channel switch 224 may switch the connection from the server 216 to the file server 230. In another example, a communication device coupled to LAN 204 may establish a connection with server 218 in order to retrieve information from the file server 228. The fibre channel switch 224 may switch the connection from the server 218 to the file server 228.

Although the networking environment of FIG. 2 provides significantly increased performance over the conventional networking environments illustrated in FIG. 1*a*, FIG. 1*b* and FIG. 1*c*, a major drawback with the networking environment of FIG. 2 is its point-to-point communication link existing between each of the hard disks and each of the plurality of file server ports. In particular, the point-to-point communication links existing between each of the hard disks and the file server ports can be quite expensive to operate and/or maintain.

Since data availability is the lifeline of every business, data loss is not only intolerable but its loss may interrupt daily operation and cause significant loss of revenue. In order to improve data availability, components with higher MTBF are required and systems are generally subjected to and are required pass a rigorous suite or battery of tests. In order to prevent data loss, storage systems which utilize, for example, fibre channel (FC) drives, are designed with a dual loop architecture which is adapted to facilitate data access through the second loop which may be utilized to provide redundancy.

FIG. 3 is a block diagram of a conventional fibre channel arbitrated loop arrangement which may be utilized for coupling a plurality of hard disks which may be found in the data storage entities of FIG. 1*a*, FIG. 1*b*, FIG. 1*c* and FIG. 2. Referring to FIG. 3, there is shown a server 302, a host bus adapter 304, and a plurality of hard disks, namely, 306*a*, 306*b*, 306*c*, 306*d*, 306*e*, 306*f*, 306*g*, 306*h*, 306*i*, 306*j* and 306*k*. Each of the hard disks 306*a*, . . . , 306*k* may comprise a port bypass controller and repeater (PBC/R) block. Each of the port bypass controller and repeater blocks may comprise a dual port architecture for redundancy.

The host bus adapter 304 interfaces with the server 302 and couples the hard disks to the server 302. The hard disks 306*a*, . . . , 306*k* are arranged in a loop or ring configuration with the first hard disk 306*a* in the ring coupled to the host bus adapter 304. The second hard disk 306*b* is coupled to the first hard disk 306*b* and the third hard disk 306*c* is coupled to the second hard disk 306*b*. The remaining hard disks are coupled or chained in a similar arrangement with the last hard disk 306*k* in the chain or loop being coupled to the host bus adapter 304. The last hard disk 306*k* is also chained to hard disk 306*j*. The fibre channel arbitrated loop (FC-AL) arrangement is a ring arrangement that is somewhat similar in arrangement to a token ring configuration, but only with regard to their configuration. With regard to its operation, the fibre channel arbitrated loop does not utilize a token for facilitating communication between nodes on the loop. Rather, the fibre channel arbitrated loop utilizes an arbitrated loop address to facilitate communication between the nodes that are coupled to the loop.

Each of the hard disks that are on the fibre channel arbitrated loop, which may also be referred to as a ring, share the bandwidth allocated for the loop. Communication over the loop occurs on a point-to-point basis between an initiating hard disk and a destination hard disk. At any particular instant during which communication occurs over the loop, only two (2) ports, may be active at the same time. The two ports that are active include the port that won loop arbitration and the port that is in communication with the port that won the arbitration. The port that has won the arbitration may be referred to as the initiating port, and the port in communication with the port that won the arbitration may be referred to as the destination port. Traffic does not have to be routed between the initiating port and the destination port since there is point-to-point communication between the initiating port and the destination port. During communication, ports other than the initiating port and the destination port in the loop are adapted to receive frames and forward the received frames to successive ports in the loop. The received frames may be data frames and control frames such as acknowledgements and ready frames. A major drawback with this type of receive and forward scheme is the increased latency penalty introduced and incurred by each successive port in the loop.

Some fibre channel arbitrated loop implementations, such as the implementation illustrated in FIG. 3, were based on analog port bypass controller (PBC) and repeaters (R). The combination of loop architecture with the port bypass controller were prone to problems, which often resulted in catastrophic loop failures since one hard disk could potentially affect the operation of all the other hard disks in the loop. These port bypass controller implementations required operators or service technicians to insert and/or remove each hard disk individually in order to determine and/or isolate the actual location of a loop failure or failed hard disk. Furthermore, an overwhelming majority of these failures were signal integrity related.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for seamless dual switching in a port bypass controller. Aspects of the method for seamless port bypass controller operation may comprise receiving an input signal at a first port of a port bypass controller and selecting at least a second port coupled in a chain to the first port. At least a portion of the received input signal may be switched from the first port to at least the second port without initializing or reconfiguring the second port. The method may also comprise repeating at least a portion of the received input signal to a second port without initializing or reconfiguring the second port. A retimed signal corresponding to at least a portion of the received input signal may be generated and switched to at least the second port without initializing or reconfiguring the second port.

Timing data may be acquired from the received input signal and at least a transmit path of the second port may be driven by at least a portion of the timing data acquired from the received input signal. At least one port may be bypassed and at least a portion of the received input signal may be switched from the first port to at least a third port coupled in the chain without initializing or reconfiguring the third port. At least a portion of the received input signal may be loopbacked from the first port to at least the second port.

In another aspect of the invention, a retimed signal corresponding to at least a portion of the received input signal may be simultaneously generated for the second port while repeating at least a portion of the received input signal to a third port coupled in the chain without initializing or reconfiguring the second port and/or the third port. The method may further comprise bypassing all ports for a first FC-Core coupled in the chain and switching at least a portion of the received input signal to at least one port in a second FC-Core coupled in the chain. A rate of the received input signal may be detected and alignment may be made to the word boundaries in the received input signal based on the detected rate of the received input signal.

Another embodiment of the invention may provide a machine-readable storage, having stored thereon, a computer program having at least one code section executable by a machine, thereby causing the machine to perform the steps as described above for seamless port bypass controller operation.

Aspects of the system for seamless port bypass controller operation may comprise a first port of a port bypass controller that receives an input signal and at least one of a plurality of selectors that selects at least a second port coupled in a chain to the first port. At least one of the selectors may switch at least a portion of the received input signal from the first port to the second port without initializing or reconfiguring at least the second port. A repeater may repeat at least a portion of the received input signal to at least the second port without initializing or reconfiguring the second port. A retimer may generate a retimed signal corresponding to at least a portion of the received input signal to the second port without initializing or reconfiguring the second port. A CDR and/or an interpolator may be configured to acquire timing data from the received input signal and utilize at least a portion of the acquired timing data to drive at least a transmit path of the second port.

The system may further comprise a bypass selector that may be utilized to bypass at least one port in the chain. The bypass selector may be adapted to switch at least a portion of the received input signal from the first port to at least a third port coupled in the chain without initializing or reconfiguring the third port. The bypass selector may also be adapted to bypass all ports for a first FC-Core coupled in the chain and switch at least a portion of the received input signal to at least one port in a second FC-Core coupled in the chain.

A loopback selector may loopback at least a portion of the received input signal from the first port to at least the second port. A retimer may simultaneously generate a retimed signal corresponding to at least a portion of the received input signal for the second port while a repeater repeats at least a portion of the received input signal to a third port coupled in the chain without initializing or reconfiguring the second port and/or the third port. The system may further comprise a speed detector and a word synchronizer. The speed detector may detect a rate of the received input signal and the a word synchronizer may align to the word boundaries in the received input signal based on the rate of the received input signal detected by the speed detector.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1b is a block diagram of an improved conventional networking environment illustrating the arrangements of various communication and storage entities, which addresses some of the drawbacks of the networking environment of FIG. 1a.

DETAILED DESCRIPTION OF THE INVENTION

Figure 1A:
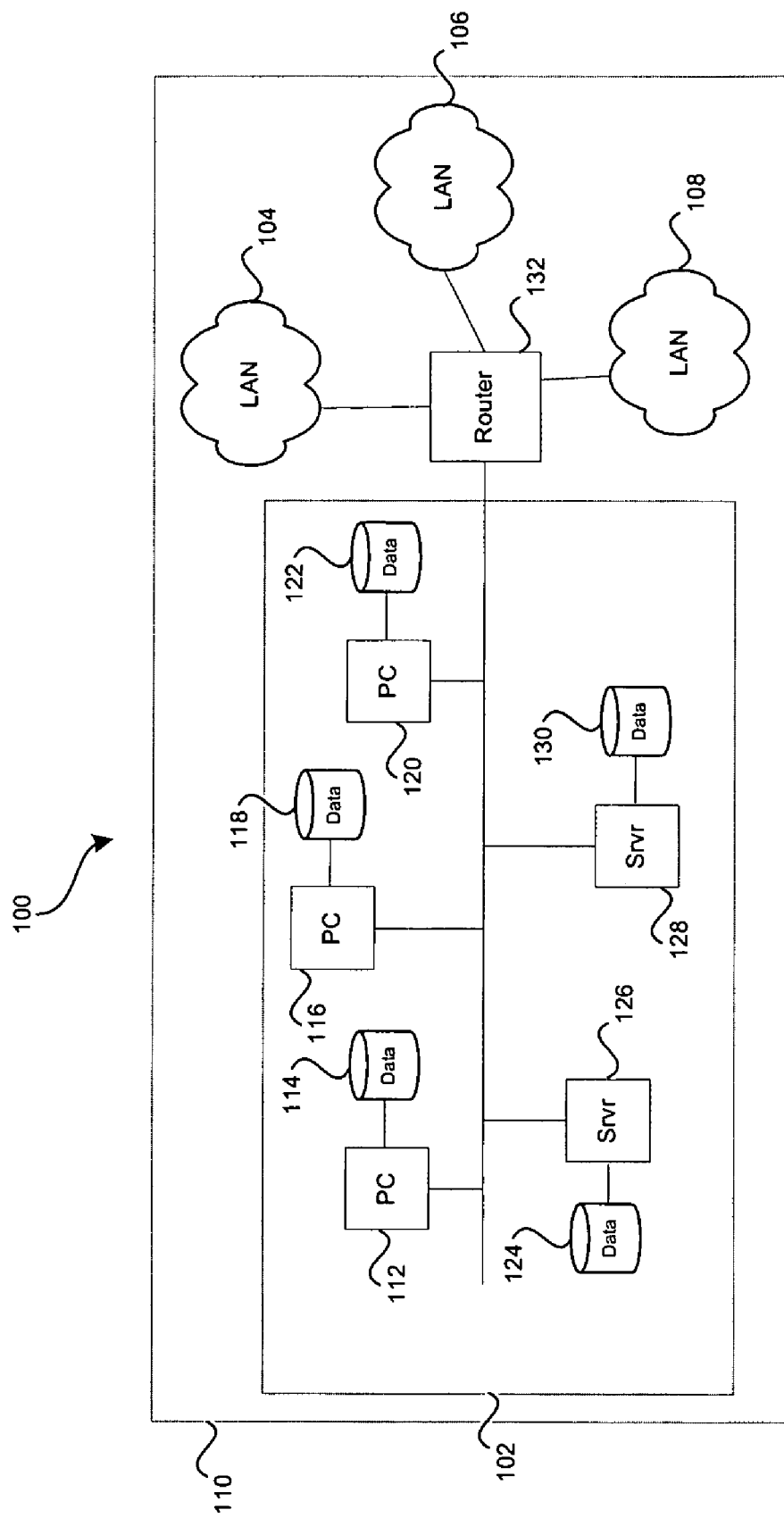
FIG. 1a is a block diagram of a conventional networking environment illustrating the arrangements of various communication and storage entities.
Figure 1B:
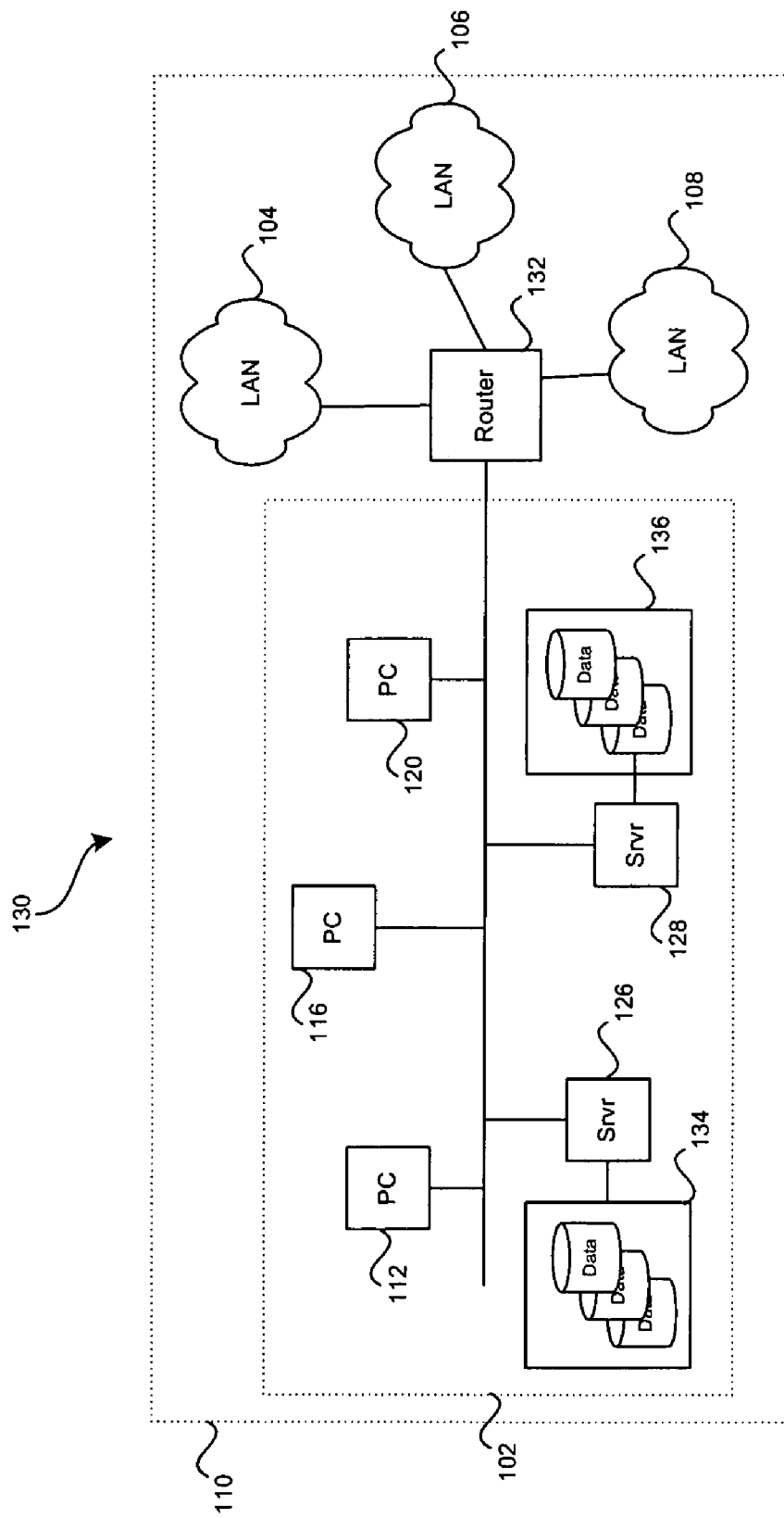
Figure 1C:
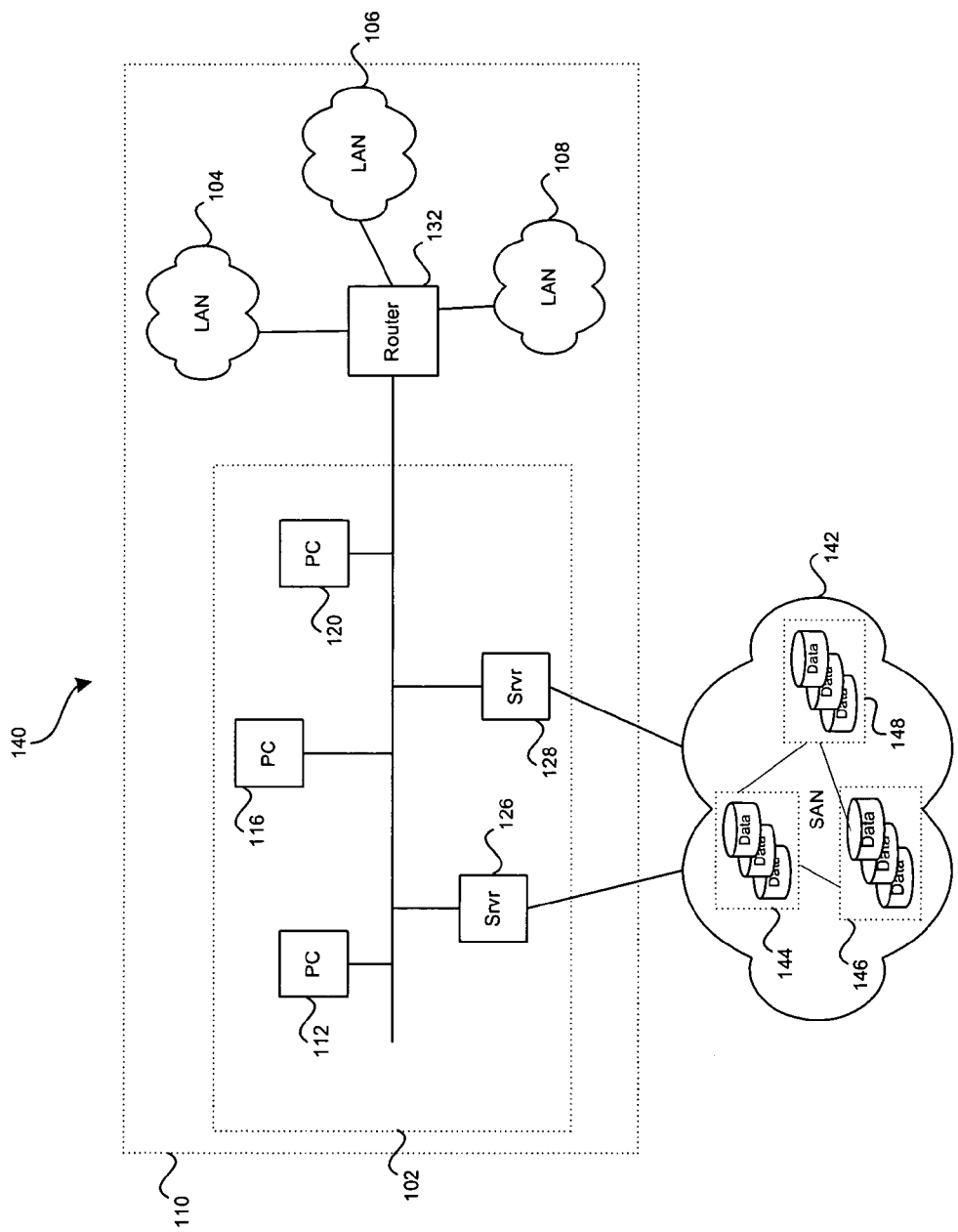
FIG. 1c is a block diagram of an improved conventional networking environment illustrating the arrangements of various communication and storage entities, which addresses some of the drawbacks of the networking environment of FIG. 1a and FIG. 1b.
Figure 2:
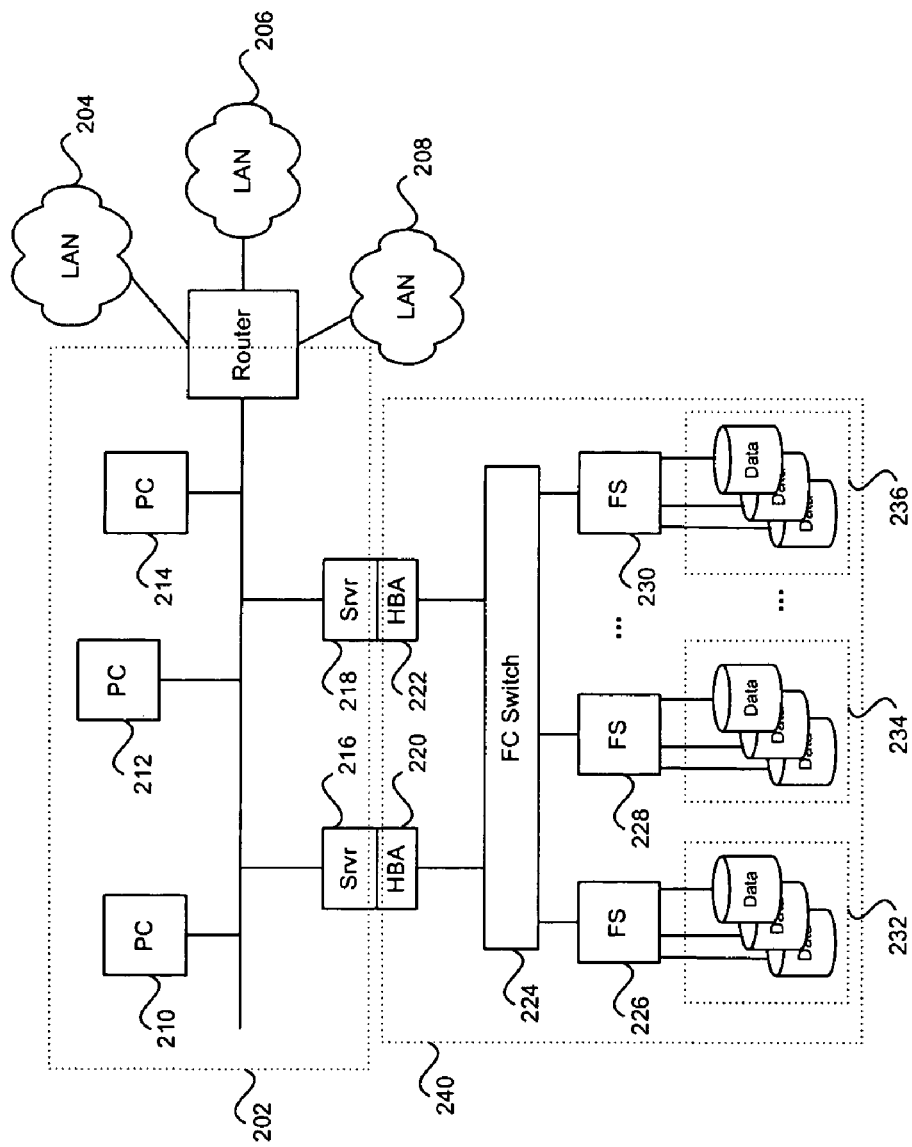
FIG. 2 is a block diagram of an exemplary local area network (LAN) coupled to a storage area network (SAN).
Figure 3:
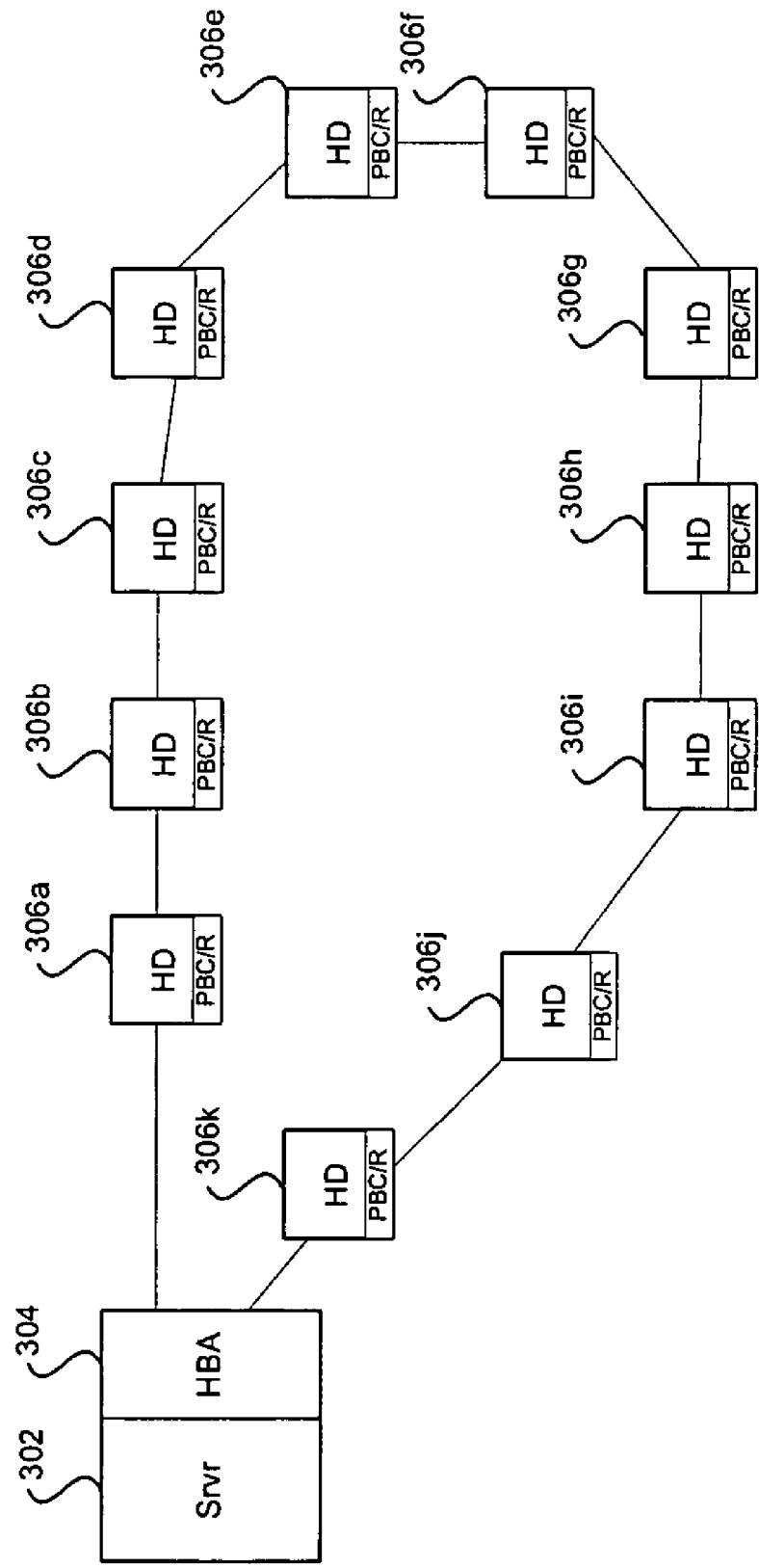
FIG. 3 is a block diagram of a conventional fibre channel arbitrated loop arrangement which may be utilized for coupling a plurality of hard disks which may be found in the data storage entities of FIG. 1a, FIG. 1b, FIG. 1c and FIG. 2.

Certain embodiments of the invention for seamless dual switching in a port bypass controller may comprise receiving an input signal at a first port of a port bypass controller and selecting at least a second port coupled in a chain to the first port. At least a portion of the received input signal may be switched from the first port to at least the second port without initializing or reconfiguring the at least the second port. The method may also comprise repeating at least a portion of the received input signal to the second port without initializing or reconfiguring the second port. A retimed signal corresponding to at least a portion of the received input signal may be generated and switched to the second port without initializing or reconfiguring the second port. Timing data may be acquired from the received input signal and at least a transmit path of the second port may be driven by at least a portion of the timing data acquired from the received input signal. One or more ports may be bypassed and at least a portion of the received input signal may be switched from the first port to at least a third port coupled in the chain without initializing or reconfiguring the third port. At least a portion of the received input signal may be loopbacked from the first port to at least the second port. Dual switching refers to repeater port switching, retimer port switching, or simultaneous repeater port switching and retimer port switching.

The introduction of active signal integrity (Active-SI™) and active line integrity (Active-LI™) technology by Broadcom Corporation of Irvine, California, has provided various improvements with regards to reliability, availability, and serviceability (RAS) of network connections. Active signal integrity (Active-SI™) and active line integrity (Active-LI™) technology incorporates, for example, the equivalent of a bit error rate (BER) tester (BERT), an oscilloscope, and a protocol analyzer into some or all of the ports of an integrated communication device. Active-SI/LI improves system reliability, availability, and serviceability (RAS) from the chip level and may aid in, for example, system development, system integration and testing, and system deployment and startup. Accordingly, active-SI/LI provides improved time to market (TTM) and may also aid in identifying and isolating faulty system components or entities in the field. All of this translates to reduced ownership cost and significantly lower maintenance costs.

With regard to, for example, storage systems or arrays, active signal integrity (Active-SI™) and active line integrity (Active-LI™) technology may be incorporated in each fibre channel (FC) port creating a new class of intelligent port bypass controllers (PBCs) which may be referred to as intelligent bunch of disks (IBODs). IBOD devices comprise the intelligence of switches but are nonetheless, transparent to data traffic. Accordingly, this may eliminate any possible protocol interoperability problems that may arise. Each IBOD port may operate as full retiming with nominal latency of, for example, 2 to 4 fibre channel (FC) words or in repeating mode with a latency of, for example, less than one (<1) FC word. Since, IBOD devices are transparent to data traffic, any conventional or other backplane may be converted with minimal redesign effort in order to utilize active signal integrity (Active-SI™) technology and active line integrity (Active-LI™) technology for improved reliability, availability and serviceability (RAS).

Although Active-SI and Active-LI technologies may be incorporated in the exemplary port bypass controllers disclosed herein, the invention is not so limited. Accordingly, aspects of the method and system for seamless dual switching in a port bypass controller may be practiced without utilizing Active-SI and Active LI technologies.

Figure 4A:
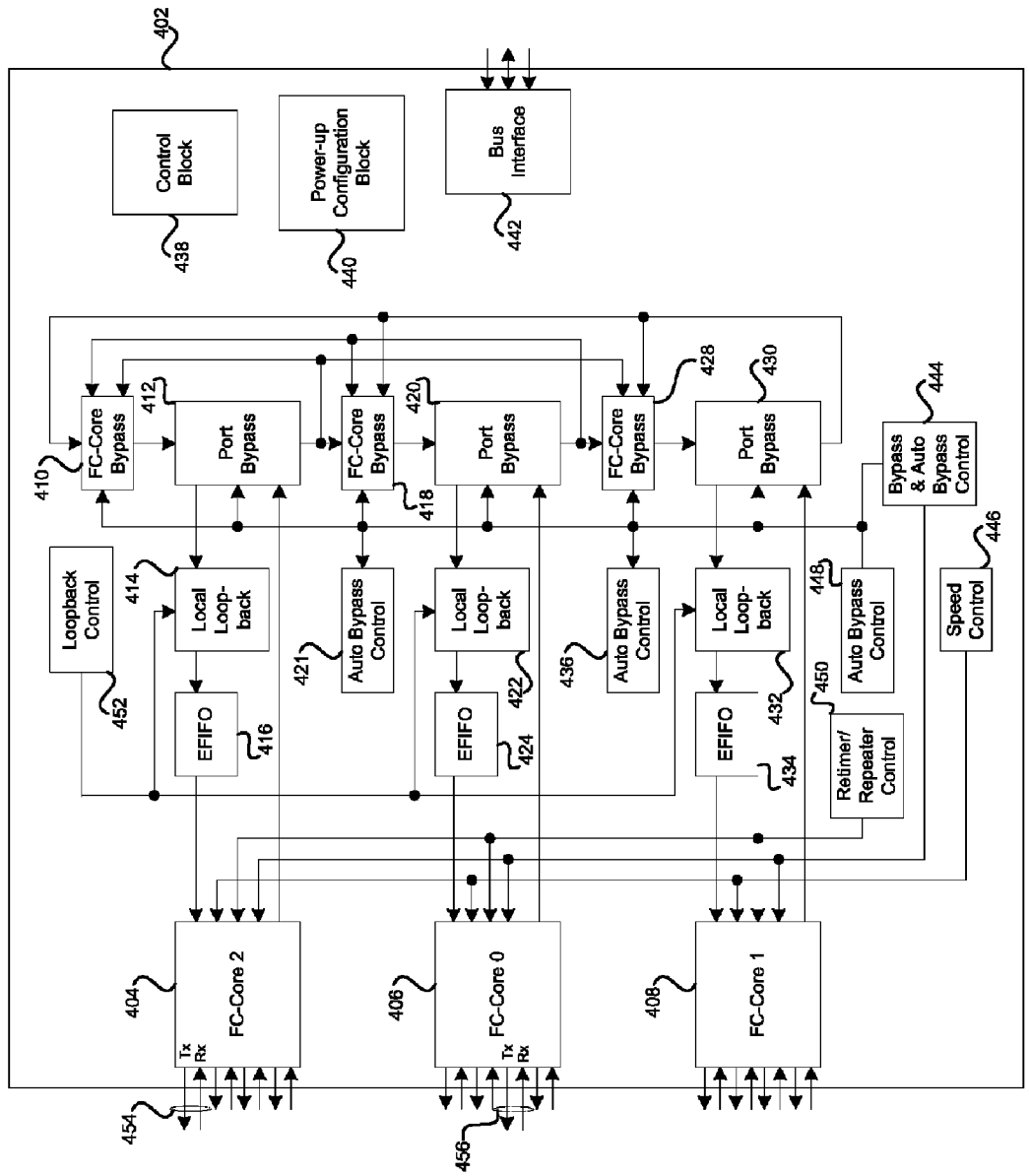
FIG. 4a is a block diagram illustrating an exemplary IBOD device that may be utilized in connection with seamless dual switching in a port bypass controller, in accordance with and embodiment of the invention.

FIG. 4a is a block diagram illustrating an exemplary IBOD device that may be utilized in connection with seamless dual switching in a port bypass controller, in accordance with and embodiment of the invention. Referring to FIG. 4a, the exemplary IBOD device 402 may comprise a plurality of FC-Cores including FC-Core 0 (406), FC-Core 1 (408), and FC-Core 2 (404), a control block 438, a power-up configuration block 440 and a bus interface block 442.

Each of the FC-Cores 404, 406, 408 has an associated control block which comprises a FC-Core bypass block, a port bypass block, a local loopback block and an EFIFO block. In this regard, the control block for FC-Core 2 (404) comprises FC-Core bypass block 410, port bypass block 412, local loopback block 414 and EFIFO 416. The control block for FC-Core 0 (406) comprises FC-Core bypass block 418, port bypass block 420, local loopback block 422 and EFIFO 424. The control block for FC-Core 1 (408) comprises FC-Core bypass block 428, port bypass block 430, local loopback block 432 and EFIFO 434.

The IBOD device 402 may also comprise a bypass and automatic bypass control block 444, speed control block 446, auto bypass control block 421, 436 and 448, retimer/repeater control block 450 and loopback control block 452. The bypass and automatic bypass control block 444, speed control block 446 and retimer/repeater control block 450 may be coupled to each of the FC-Cores 404, 406, 408. The bypass and automatic bypass control block 444 and automatic bypass control block 448 may be coupled to each of the port bypass block 412, 420 and 430. The loopback control block 452 may be coupled to each of the local loopback blocks 414, 422, 432 for each of the FC-Cores 404, 406, 408 respectively.

Each of the FC-Core bypass blocks 410, 418, 428 associated with FC-Cores 404, 406, 408 may comprise a multiplexer or other suitable selector that may be adapted to bypass a corresponding FC-Core when the multiplexer or selector is enabled. For example, FC-Core bypass block 410 may be utilized to bypass FC-core 404 when the FC-Core bypass block 410 is enabled. Similarly, the FC-Core bypass block 418 may be utilized to bypass FC-core 406 when the FC-Core bypass block 418 is enabled. Finally, FC-Core bypass block 428 may be utilized to bypass FC-core 408 when the FC-Core bypass block 428 is enabled. When a FC-Core is bypassed, all the ports for that FC-Core are bypassed.

Each of the port bypass blocks 412, 420, 430 associated with FC-Cores 404, 406, 408 respectively may comprise suitable logic, circuitry and/or code that may be adapted to effectuate port bypass.

Each of the local loopback blocks 414, 422, 432 associated with FC-Cores 404, 406, 408 respectively may comprise suitable logic, circuitry and/or code that may be adapted to place a corresponding port of the FC-Core in a local loopback. In this regard, a particular local loopback block may internally configure a particular port of a FC-Core so that the transmit (Tx) and receive (Rx) lines for that particular port are cross connected. For example, local loopback block 414 may internally configure port 454 of FC-Core 404 so that its transmit (Tx) and receive (Rx) lines are cross connected. The loopback control block 452 may comprise suitable logic, circuitry and/or code that may be adapted to control each of the local loopback blocks 414, 422, 432 for each of the FC-Cores 404, 406, 408 respectively. For example, loopback control block 452 may configure port 456 associated with FC-Core 406 in a local loopback mode. In local loopback mode, the transmit (Tx) lines and receive (Rx) lines for a particular port may be cross connected from within the corresponding FC-Core.

Each of the elastic FIFO (EFIFO) blocks 416, 424, 434 associated with FC-Cores 404, 406, 408 respectively may comprise suitable logic and/or circuitry that may be adapted to introduce and change a data rate and/or phase of received and/or transmitted data handled by the FC-Cores 404, 406 and 408.

The bypass and automatic bypass control block 444 and the automatic bypass block 448 may comprise suitable logic, circuitry and/or code that may be adapted to control bypass of at least one of the ports for a particular FC-Core. Accordingly, the bypass and automatic bypass control block 444 and/or the automatic bypass block 448 in conjunction with a corresponding port bypass block may be utilized to bypass one or more of the ports for a particular FC-Core. For example, port bypass and automatic bypass control block 444 and/or the automatic bypass block 448 in conjunction with port bypass block 420 may be configured to enable or disable at least one port such as port 456 of FC-Core 406.

The speed control block 446 may comprise suitable logic, circuitry and/or code that may be adapted to control and adapt the operation of the FC-Cores 404, 406, 408 to a plurality of different data rates. Additionally, the speed control block may be further adapted for automatic speed negotiation.

The repeater/retimer control block 450 may comprise suitable logic, circuitry and/or code that may be adapted to control retiming and repeating of signals for each of the ports for the FC-Cores integrated within the IBOD device 402.

The power-up configuration block 440 may comprise suitable logic, circuitry and/or code that may be utilized to initialize the IBOD device 402. Suitable logic may include, but is not limited to, registers and/or memory that may be adapted to store initialization parameters and/or values. For example, the power-up configuration block 440 may comprise a plurality of control registers.

The control block 438 may comprise suitable logic, circuitry and/or code that may be utilized to configure and control the operations of the IBOD device 402. Suitable logic may comprise one or more registers and/or memory that may be adapted to configure various operations for the IBOD device 402. The control block 438 may further comprise a plurality of status registers that may be read in order to determine an operational state of the IBOD device.

The bus interface block 442 may be, for example, a serial or parallel interface bus that may be adapted to provide communication between the IBOD 402 and a host processor or CPU, for example. In one exemplary embodiment of the invention, the bus interface block 442 may be a standardized I²C bus.

Figure 4B:
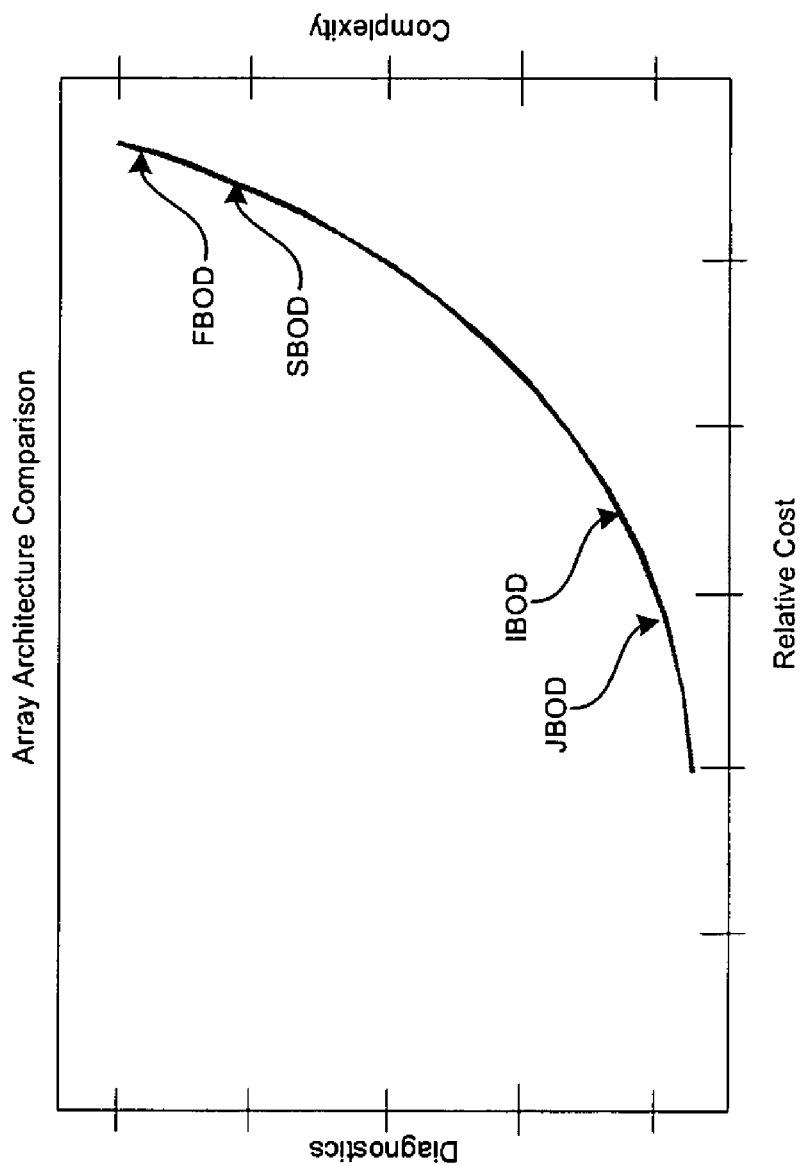
FIG. 4b is a graph illustrating a comparison of just bunch of disk (JBOD), intelligent bunch of disk (IBOD™), switched bunch of disk (SBOD), and fabric bunch of disk (FBOD™) that may be utilized in connection with seamless dual switching in a port bypass controller, in accordance with an embodiment of the invention.

FIG. 4b is a graph illustrating a comparison of just bunch of disk (JBOD), intelligent bunch of disk (IBOD™), switched bunch of disk (SBOD), and fabric bunch of disk (FBOD™) technologies that may be utilized in connection with seamless dual switching in a port bypass controller, in accordance with an embodiment of the invention. Referring to FIG. 4b, the left vertical axis refers to diagnostics capability, the right vertical axis refers to complexity and the horizontal axis refers to relative costs. At the lower end of the curve is JBOD, next higher is IBOD, next higher is SBOD and the highest end is FBOD. One technology driving and enabling IBODs is advanced serializer/deserializer (SerDes or SERDES) technology which incorporates Active-SI and Active-LI. Although FBOD and SBOD have the highest relative cost and greatest complexity, hybrid implementations of IBOD and FBOD may be provided which offer improved scaling and performance with cost on par with SBOD.

Figure 5:
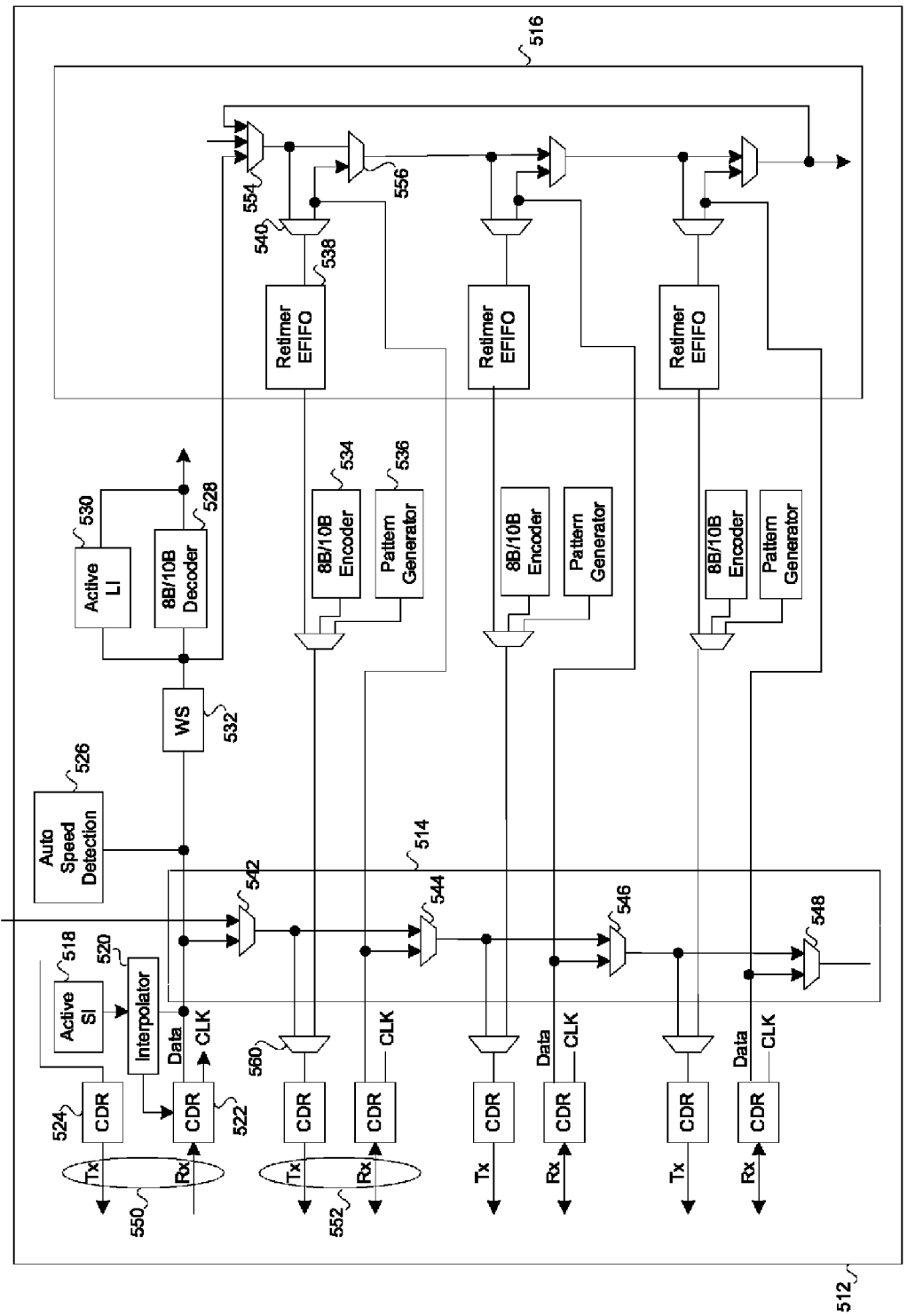
FIG. 5 is a block diagram illustrating an exemplary FC-Core repeater/retimer port switch that may be utilized in connection with the IBOD device of FIG. 4a, for example, for seamless dual switching in a port bypass controller, in accordance with an embodiment of the invention.

FIG. 5 is a block diagram illustrating an exemplary FC-Core repeater/retimer port switch that may be utilized in connection with the IBOD device of FIG. 4a, for example, for seamless dual switching in a port bypass controller, in accordance with an embodiment of the invention. Referring to FIG. 5, the FC-Core repeater/retimer port switch may comprise a FC-Core block 512 The FC-Core block 512 may comprise an active signal integrity block 518, interpolator 520, auto speed detection block 526, word synchronization (WS) block 532, active line integrity block 530, 8B/10B decoder block 528, 8B/10B encoder block 534, and pattern generator 536.

FIG. 5 further comprises a repeater function block 514 and a retimer switch block 516. The repeater function block 514 may comprise suitable logic and/or circuitry that may be utilized to implement the repeater function for each FC-Core such as FC-Core 512. The retimer switch block 516 illustrates exemplary logic that may be utilized for retiming function.

The FC-Core repeater/retimer port switch may also comprise a plurality of clock and data recovery (CDR) circuit blocks such as CDRs 524 and 522. The CDRs may be arranged in pairs in which a first CDR of a pair is configured to handle a receive (Rx) side, and a second CDR of the pair is configured to handle a transmit (Tx) side for a particular port. For example, CDR 522 is configured as a receive CDR and CDR 524 is configured as a transmit CDR. The combination of a receive CDR and a transmit CDR pair may be referred to as a port. The FC-Core as illustrated comprises four (4) ports. However, the invention is not limited in this regard and each FC-Core may comprise more than or less than, four (4) ports. Each port may be adapted to handle a single FC hard disk. A plurality of FC-ports may be coupled together and integrated into a single chip or integrated circuit. For example, three (3) FC-Cores each having four ports may be coupled together and integrated into a single chip which can handle 12 ports. In this regard, theoretically, a maximum of 12 hard disks may be handled by the twelve (12) ports. Although the interpolator block 520 is illustrated separately from the CDR block 522, the interpolator 520 may be part of the CDR 522. From a functional point of view, as illustrated, the CDR 522 may be viewed as an analog portion and the interpolator 520 may be viewed as a digital portion of a CDR.

The signal integrity block 518 may be adapted to initiate and manage signal integrity testing. Likewise, the active line integrity block 530 may be adapted to manage line integrity testing. U.S. application Ser. No. 10/779,001 discloses the functions and operation of active signal integrity and active line integrity and is hereby incorporated herein by reference in its entirety.

The interpolator 520 may be a hardware driven and/or software driven interpolator that may be adapted to track the phase of incoming or received data for active signal integrity operation. The auto speed detection block 526 comprises suitable logic, circuitry and/or code that may be adapted to automatically control speed negotiation at the physical coding sublayer (PCS) on the receiver side. In an embodiment of the invention, the auto speed detection block 526 may comprise a firmware algorithm the may reside on-chip within the IBOD device. The word synchronization (WS) block 532 may be adapted to provide synchronization at the physical coding sublayer (PCS) on the receiver side. In this regard, the word synchronization (WS) block 532 may be adapted to provide, for example, word boundary alignment.

The 8B/10B decoder block 528 may be a standardized 8B/10B compliant decoder that may be utilized to decode 10 bits of data into 8 bits of data. The 8B/10B encoder block 534 is a standardized 8B/10B compliant encoder that may be utilized to encode 8 bits of data into 10 bits of data. The pattern generator 536 may be adapted to generate control words or bit patterns or sequences that may be utilized, for example, for bit error rate testing. In this regard, one or more ports may be placed in loopback and tested by sending, for example, control words, ordered sets and/or bit patterns from the pattern generator 536. The auto speed detection block 526 may be adapted to detect the data speed and setup the appropriate clock signals, for example, the transmit and receive clocks, to provide the correct timing.

Figure 6:
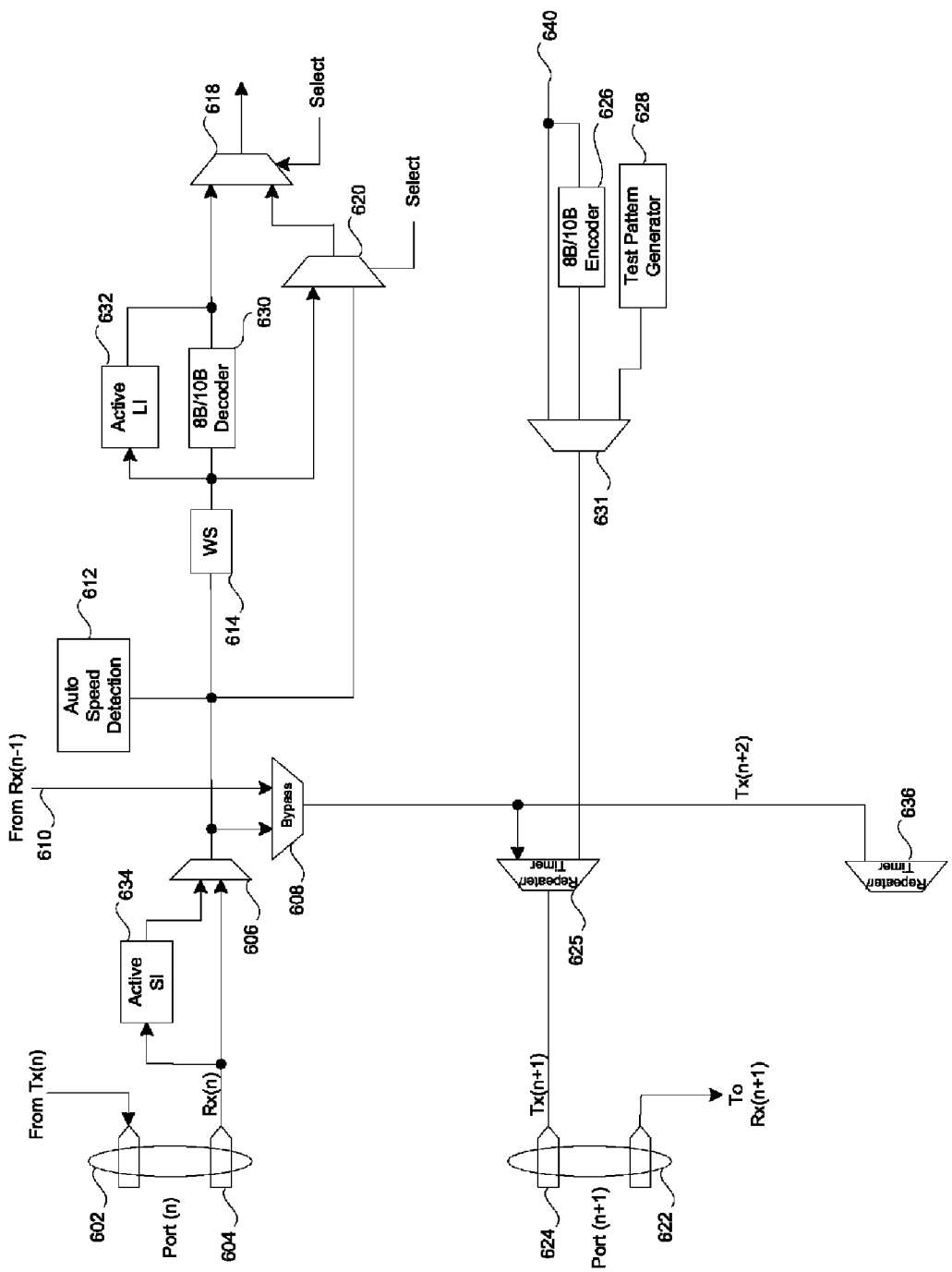
FIG. 6 is a block diagram of an exemplary architecture of an FC-Core repeater port switch for a transmit side and a receive side of the FC-Core repeater/retimer port switch of FIG. 5, for example, which may be utilized in connection with the IBOD device of FIG. 4a, for example, for seamless dual switching in a port bypass controller, in accordance with an embodiment of the invention.

FIG. 6 is a block diagram of an exemplary architecture of an FC-Core repeater port switch for a transmit side and a receive side of the FC-Core repeater/retimer port switch of FIG. 5, for example, which may be utilized in connection with the IBOD device of FIG. 4a, for example, for seamless dual switching in a port bypass controller, in accordance with an embodiment of the invention. FIG. 6 illustrates a transmit side of a first port 602 and a receive side of a second consecutive port 622 of the FC-Core repeater/retimer port switch of FIG. 5. Accordingly, FIG. 6 may be utilized to illustrate the operation of the repeater function block 514 illustrated in FIG. 5.

Referring to FIG. 6, there is shown a receive section 604 of port 602. For simplicity, the CDR 522 and interpolator 520 illustrated in FIG. 5 are not shown. Notwithstanding, the receive side may comprise an active signal integrity (SI) block 634, a selector 606, bypass selector 608, auto speed detection block 612, word synchronizer block 614, active line integrity (LI) block 632, 8B/10B decoder 630, selector 618 and selector 620.

Each of the selectors 606, 608, 618 and 620 may comprise suitable logic and/or circuitry that may be adapted to select, enable and/or disable one or more signals that may be coupled thereto. Accordingly, when a signal is received at port 604, the CDR and interpolator (not shown in FIG. 6) may recover the clock and the recovered clock may be utilized to demultiplex the signal. The demultiplexed signal may be passed to the active signal integrity block 634 for processing and/or it may be transferred to the selector 606. This output signal transferred to the selector 606 may be utilized to provide timing for the transmit port Tx(n+1) 624.

The output signal from the selector or MUX 606 may be transferred to the bypass multiplexer or selector 608, and/or to the auto speed detection block 612, which may determine a data rate of the demultiplexed signal. Once the data rate of the signal has been determined, the resulting timing information may be utilized by the word synchronization (WS) block 614 to align to the word boundaries in the demultiplexed received signal. With regard to port switching, the active line integrity block 632 and the active signal integrity block 634 may not be required.

A resulting signal from the word synchronization (WS) block 614 may be decoded by the 8B/10B decoder block 630 or it may be processed by the active line integrity block 632. The selector or multiplexer 620 may be adapted to select between an output of the word synchronizer block 614 and non-word synchronized version of the demultiplexed received signal. The selector or multiplexer 618 may be adapted to select between an output of the 8B/10B decoder and the selector 620.

In general, in repeater mode, a signal received at a current port from a prior port in the chain, for example, may be repeated and passed onto a successive port in the chain. The CDR for the current receive port may be adapted to recover the clock signal from the signal received from the prior port in the chain. This recovered clock signal may be passed on to a successive port in the chain where it may be utilized to drive the transmit side of the successive port. In this regard, the output signal from the selector or MUX 606 may be transferred to the bypass selector or multiplexer 608 and upon selection by the bypass selector 608, the signal may be repeated to port 622. In the bypass mode, signal 610 from port Rx(n−1) may bypass port 602 and be transferred to ports 624 and/or Tx(n+2). The bypass selector or multiplexer 608 may also be referred to as a repeater selector or multiplexer. In a case where port 602 is bypassed, the timing may be acquired from a prior port via signal 610. Signal 610 may be derived from, for example, another FC-Core in the chain.

On the receive side, signal 640 may be passed directly to the selector or multiplexer 631 or signal 640 may be 8B10B encoded by the 8B10B encoder block 626. Signal 640 may be a retimed signal, for example. The resulting 8B10B encoded signal may be transferred to the selector 631. The selector or multiplexer 631 may select either the resulting encoded 8B10 signal or the signal 640 for transferring to the retransmitter/retimer selector 625. The retransmitter/retimer selector 625 may select the output of the selector 631 to be transferred to the transmit port 624. The test pattern generator 628 may be utilized for testing and may be configured to generate test codes and/or patterns such as fibre channel codes, frames and/or ordered sets. Accordingly, when utilized in conjunction with port bypass or switching, any port may be readily tested without the need to reconfigure or initialize the port, or to employ expensive external test equipment.

Figure 7:
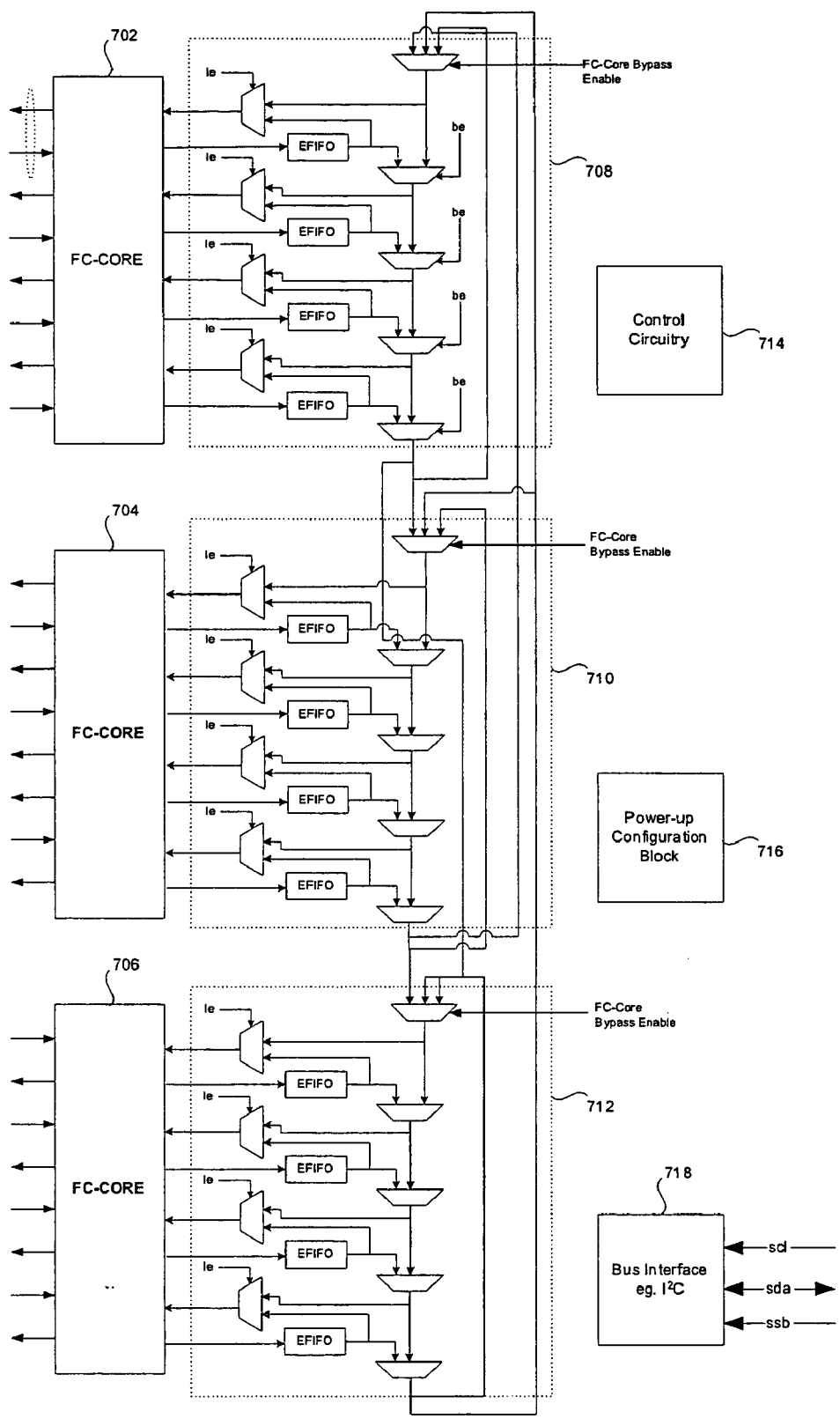
FIG. 7 is a block diagram of an exemplary embodiment of a retimer port switch architecture that may be utilized in connection with the IBOD device of FIG. 4a, for example, for seamless dual switching in a port bypass controller, in accordance with an embodiment of the invention.

FIG. 7 is a block diagram of an exemplary embodiment of a retimer port switch architecture that may be utilized in connection with the IBOD device of FIG. 4a, for example, for seamless dual switching in a port bypass controller, in accordance with an embodiment of the invention. Referring to FIG. 7, there is shown FC-Cores 702, 704, 706 and their respective retimer blocks 708, 710, 712, control circuitry block 714, power up configuration block 716, and a bus interface block 718, such as an I²C bus interface.

Figure 8:
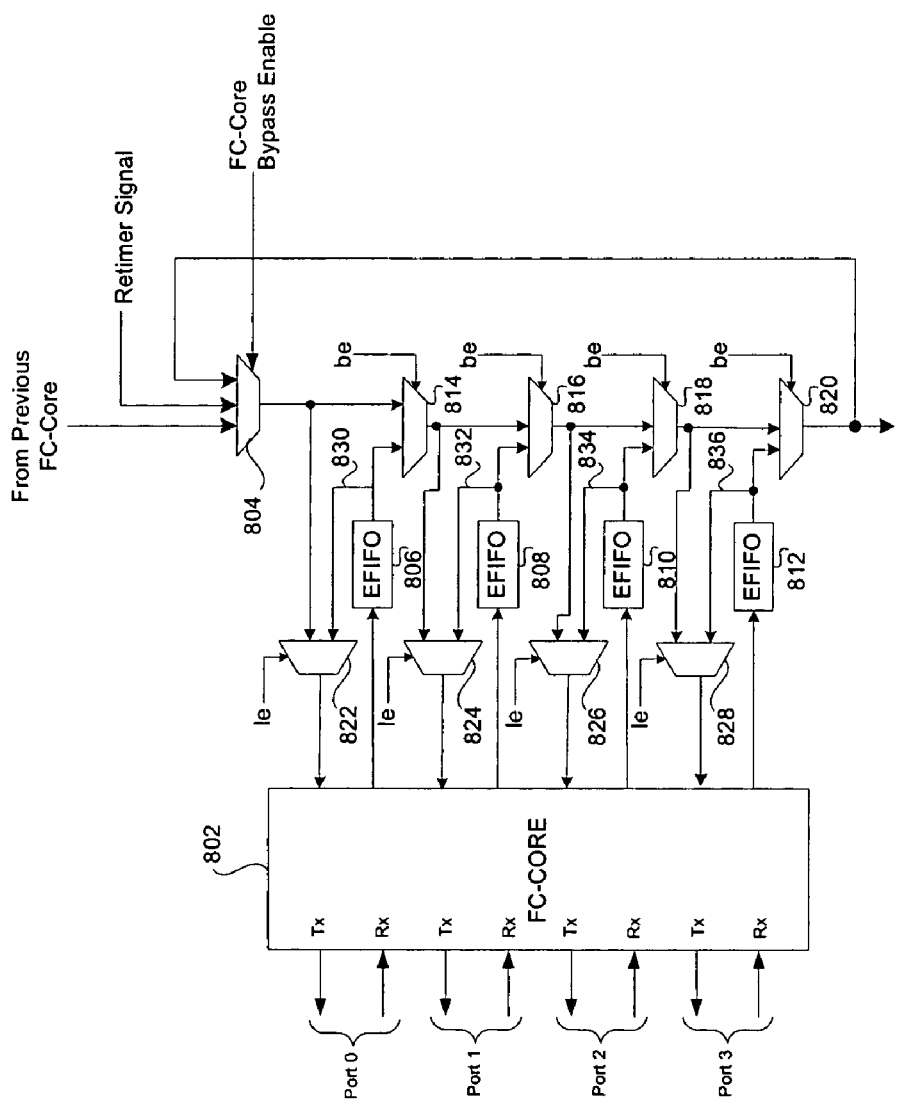
FIG. 8 is a block diagram of a portion of the retimer port switch architecture of FIG. 7 that may be utilized for handling a single FC-Core which may be utilized in connection with the IBOD device of FIG. 4a, for example, for seamless dual switching in a port bypass controller, in accordance with an embodiment of the invention.

FIG. 8 is a block diagram of a portion of the retimer port switch architecture of FIG. 7 that may be utilized for handling a single FC-Core, which may be utilized in connection with the IBOD device of FIG. 4a, for example, for seamless dual switching in a port bypass controller, in accordance with an embodiment of the invention. Referring to FIG. 8, there is shown FC-Core 802, EFIFOs 806, 808, 810, 812, loopback enable selectors or multiplexers 822, 824, 826, 828, bypass selectors 814, 816, 818, 820 and FC-Core bypass enable selector or multiplexer 804. FIG. 8 further comprises loopback paths 830, 832, 834 and 836.

The FC-Core bypass enable selector or multiplexer 804 may be utilized to enable or disable the ports in the FC-Core. For example, if the FC-Core bypass enable selector 804 is enabled, then any of port 0, port 1, port 2 and port 3 may be active. However, if the FC-Core bypass enable selector 804 is disabled, then all of the FC-Core ports including port 0, port 1, port 2 and port 3 will be inactive. In effect, when the FC-Core bypass enable selector 804 is disabled, then the FC-Core 802 is effectively disabled. Notwithstanding, in the case where the FC-Core bypass enable selector 804 is enabled, then any one or more of the of the port for FC-Core 802 may be bypassed. In this regard, bypass enable (be) selector 814 may be utilized to bypass port 0 and bypass enable selector 816 may be utilized to bypass port 1. Similarly, bypass enable selector 818 may be utilized to bypass port 2 and bypass enable selector 820 may be utilized to bypass port 3.

The loopback enable (le) selector 822 may be utilized to place port 0 in loopback via path 830 and the loopback enable selector 824 may be utilized to place port 1 in loopback via path 832. Similarly, the loopback enable selector 826 may be utilized to place port 2 in loopback via path 834 and the loopback enable selector 828 may be utilized to place port 3 in loopback via path 836. For example, a signal received from port 3 may pass through EFIFO 812 and be loopbacked through path 836. Similarly, a signal received from port 1 may pass through EFIFO 808 and be loopbacked through path 832.

Figure 9:
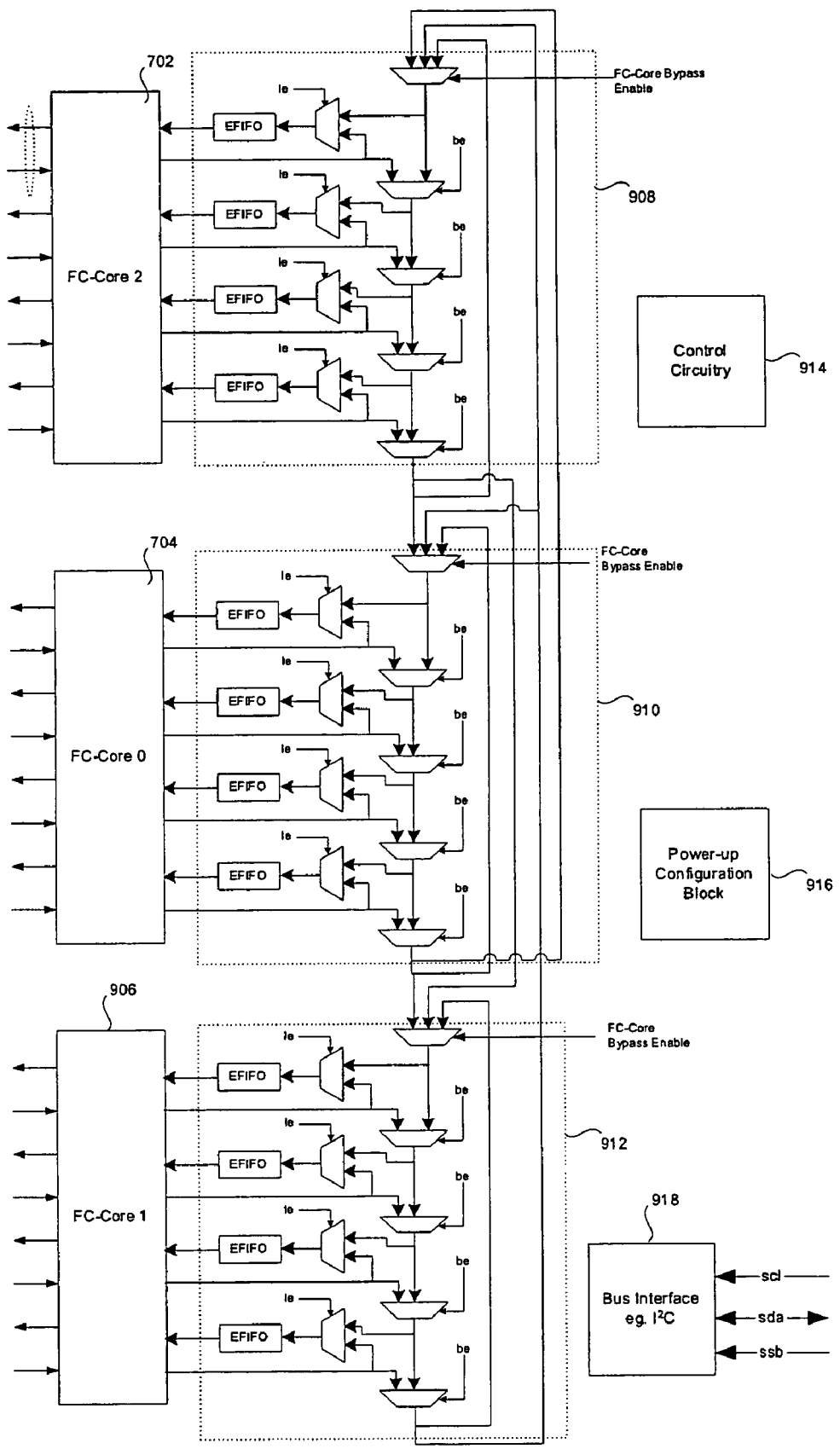
FIG. 9 is a block diagram of another exemplary embodiment of a retimer port switch architecture that may be utilized in connection with the IBOD device of FIG. 4a, for example, for seamless dual switching in a port bypass controller, in accordance with an embodiment of the invention.

FIG. 9 is a block diagram of another exemplary embodiment of a retimer port switch architecture that may be utilized in connection with the IBOD device of FIG. 4a, for example, for seamless dual switching in a port bypass controller, in accordance with an embodiment of the invention. Referring to FIG. 9, there is shown FC-Cores 902, 904, 906 and their respective retimer blocks 908, 910, 912, control circuitry block 914, power up configuration block 916, and a bus interface block 918 such as an I²C interface.

Figure 10:
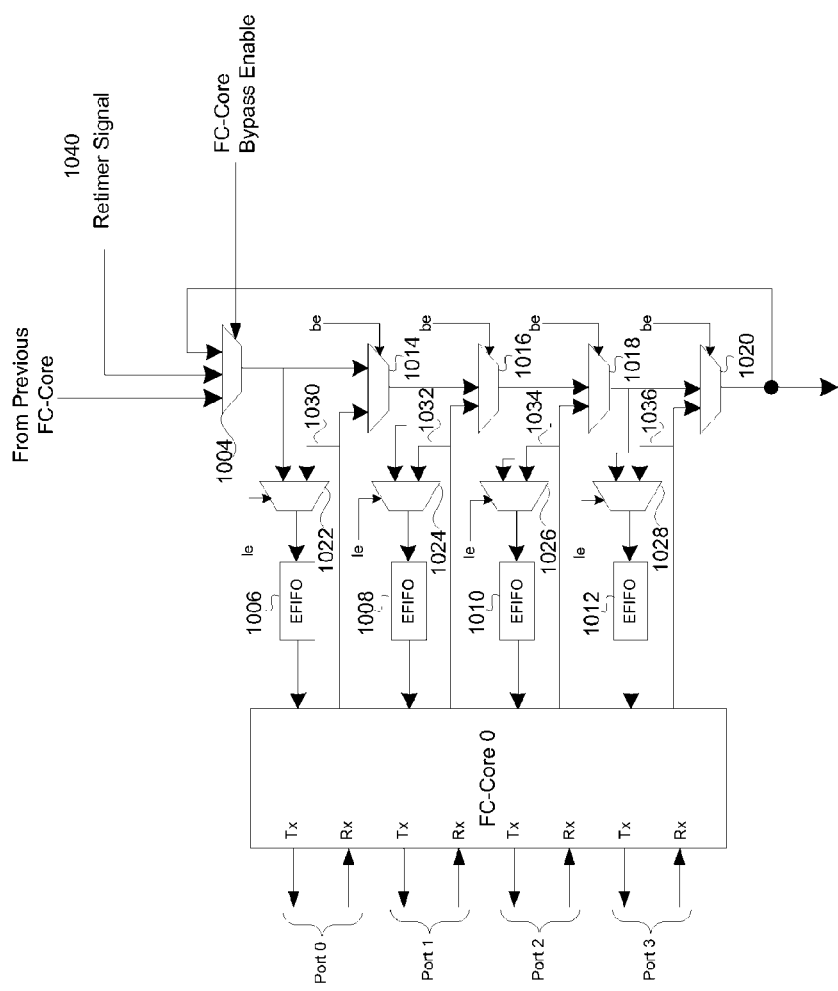
FIG. 10 is a block diagram of a portion of the retimer port switch architecture of FIG. 9, for example, that may be utilized for handling a single FC-Core which may be utilized in connection with the IBOD device of FIG. 4a, for example, for seamless dual switching in a port bypass controller, in accordance with an embodiment of the invention.

FIG. 10 is a block diagram of a portion of the retimer port switch architecture of FIG. 9, for example, that may be utilized for handling a single FC-Core which may be utilized in connection with the IBOD device of FIG. 4a, for example, for seamless dual switching in a port bypass controller, in accordance with an embodiment of the invention. Referring to FIG. 10, there is shown FC-Core 1002, EFIFOs 1006, 1008, 1010, 1012, loopback enable selectors or multiplexers 1022, 1024, 1026, 1028, bypass selectors 1014, 1016, 1018, 1020 and FC-Core bypass enable selector or multiplexer 1004. In FIG. 10, the EFIFOs 1006, 1008, 1010, 1012 are configured so that they are located after or at the output of the loopback enable selectors as opposed the FIG. 8 where the EFIFOs 806, 808, 810, 812 are placed before or at the inputs of the bypass selectors 814, 816, 818, 820.

The FC-Core bypass enable (be) selector or multiplexer 1004 may be utilized to enable or disable the ports in the FC-Core. For example, if the FC-Core bypass enable selector 1004 is enabled, then any of port 0, port 1, port 2 and port 3 may be active. However, if the FC-Core bypass enable selector 1004 is disabled, then all of port 0, port 1, port 2 and port 3 will be inactive. In effect, when the FC-Core bypass enable selector 1004 is disabled, then the FC-Core 1002 is effective disabled. Notwithstanding, in the case where the FC-Core bypass enable selector 1004 is enabled, then any one or more of the ports for FC-Core 1002 may be bypassed. In this regard, bypass enable (be) selector 1014 may be utilized to bypass port 0 and bypass enable selector 1016 may be utilized to bypass port 1. Similarly, bypass enable selector 1018 may be utilized to bypass port 2, and bypass enable selector 1020 may be utilized to bypass port 3.

The loopback enable (le) selector 1022 may be utilized to place port 0 in loopback via path 1030 and the loopback enable selector 1024 may be utilized to place port 1 in loopback via path 1032. Similarly, the loopback enable selector 1026 may be utilized to place port 2 in loopback via path 1034 and the loopback enable selector 1028 may be utilized to place port 3 in loopback via path 1036. For example, a signal received from port 3 may pass through EFIFO 1012 and be loopbacked through path 1036. Similarly, a signal received from port 1 may pass through EFIFO 1008 and be loopbacked through path 1032.

The retimer signal 1040 may be coupled to any of the ports of the FC-Core 1002 whenever the FC-Core bypass enable selector 1004 is enabled. For example, with the FC-Core bypass enable selector 1004 enabled and the bypass selector 1014 enabled, the retimer signal may be coupled to the EFIFO 1008 for port 2. However, in this case, if the bypass selector 1016 is disabled, then the recovered clock from port 2 will be supplied to port 3.

Figure 11:
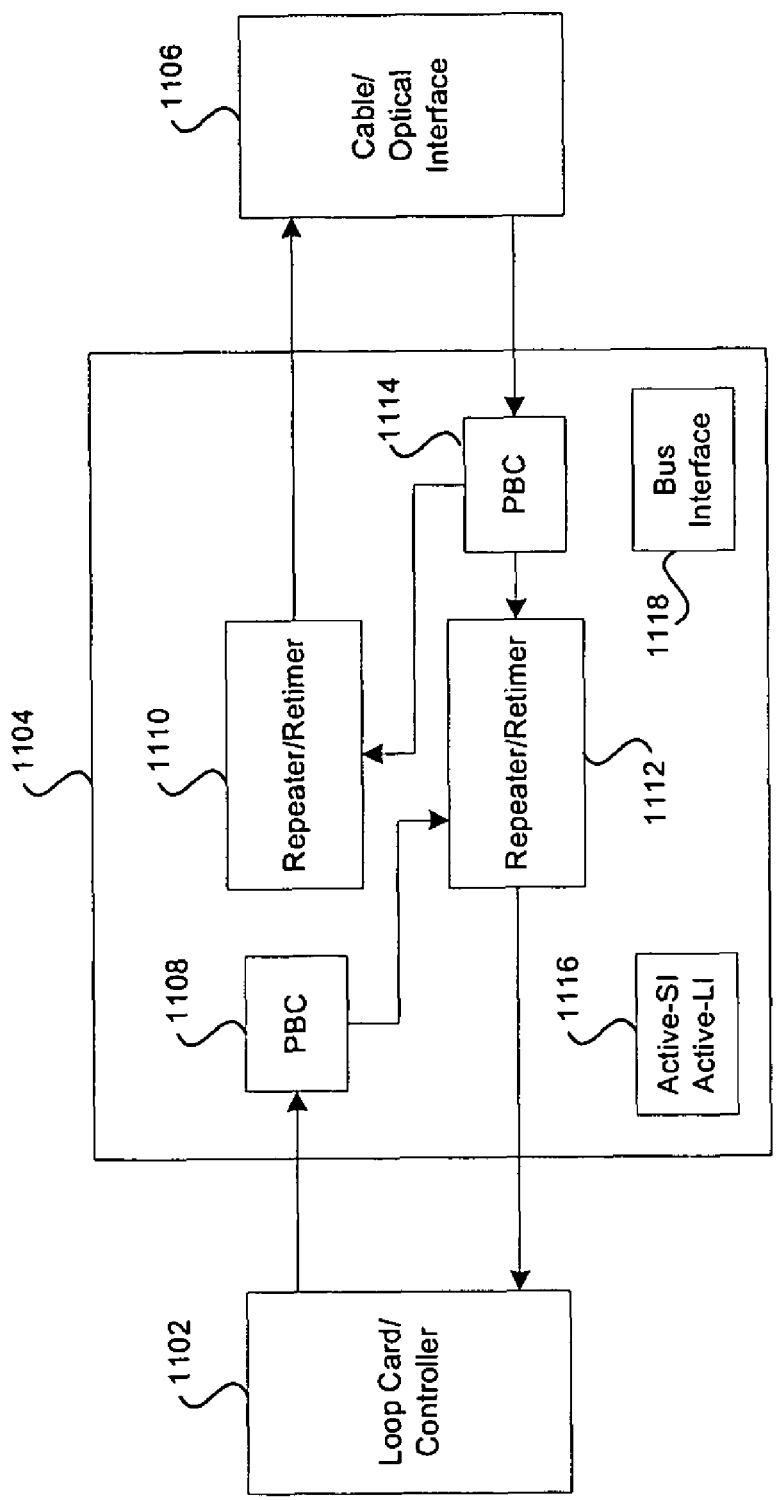
FIG. 11 is a block diagram illustrating an exemplary dual retimer/repeater application that may be utilized in connection with seamless dual switching in a port bypass controller, in accordance with an embodiment of the invention.

FIG. 11 is a block diagram illustrating an exemplary dual retimer/repeater application that may be utilized in connection with seamless dual switching in a port bypass controller, in accordance with an embodiment of the invention. Referring to FIG. 11, there is shown a loop card/controller block 1102, a dual retimer/repeater switch block 1104 and a cable/optical interface block 1106. The dual retimer/repeater switch block 1104 may comprise a port bypass controller blocks 1108, 1114, repeater/retimer blocks 1110, 1112, active-SI and active-LI block 1116 and bus interface block 1118. The loop card controller 1102 may be a CPU or other controller device that may be adapted to handle a plurality of dual retimer/repeater switch blocks, which may be coupled to a backplane bus, for example. The cable optical interface 1106 may comprise optical and/or electrical interfaces which may be adapted to provide coupling to a transmission media.

In the dual retimer/repeater configuration of FIG. 11, the port bypass controller 1104 and the repeater/retimer 1110 may be adapted to handle the transmit side from the loop card/controller block 1102 to the cable/optical interface block 1106. Similarly, the port bypass controller 1114 and the repeater/retimer 1112 may be adapted to handle the receive side to the loop card/controller block 1102 from the cable/optical interface block 1106. The PBC 1108 on the transmit side may be coupled to the repeater/retimer block 1112 on the receive side to facilitate the repeater and retimer functions. In this regard, clock signals may be recovered from ports on the receive side and utilized to drive ports on the transmit side. In a similar manner, PBC 1114 on the receive side may be coupled to the repeater/retimer block 1110 on the transmit side to facilitate the repeater and retimer functions. In this regard, clock signals may be recovered from ports on the receive side and utilized to drive ports on the transmit side.

Figure 12:
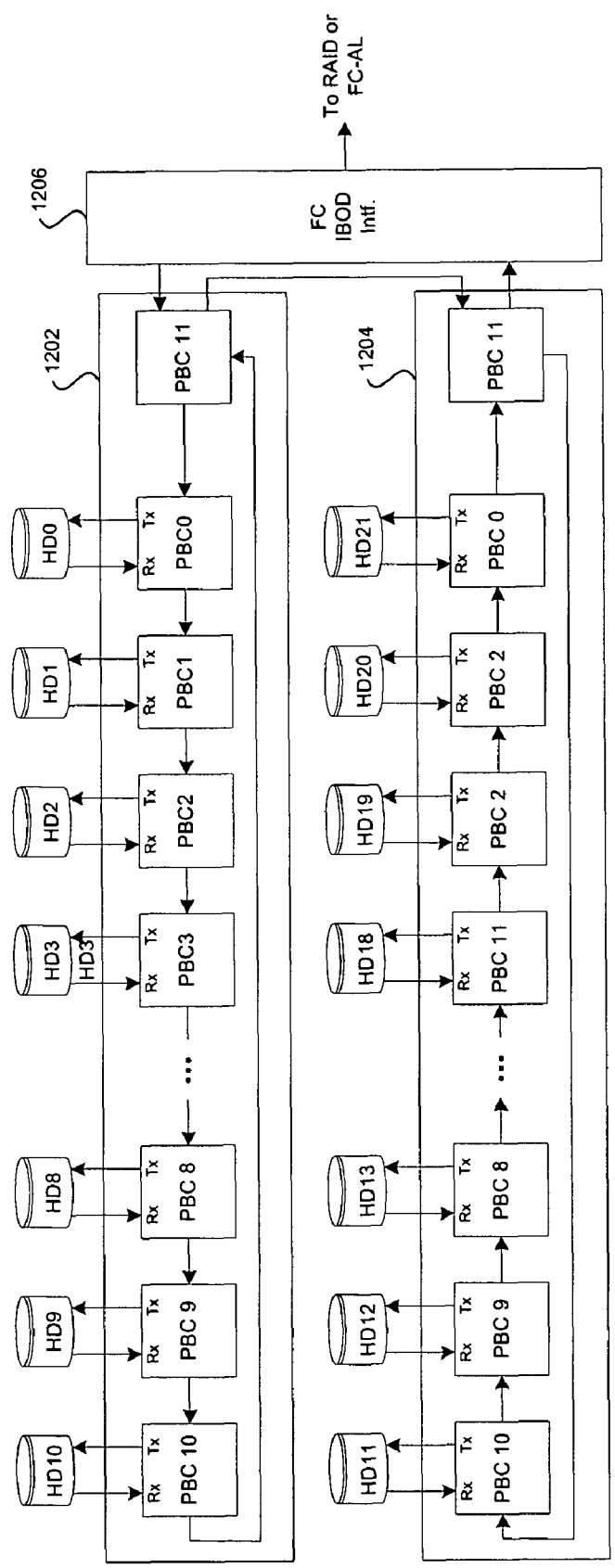
FIG. 12 is a block diagram illustrating an exemplary 12-port PBC IBOD application that may be utilized in connection with seamless dual switching in a port bypass controller, in accordance with an embodiment of the invention.

FIG. 12 is a block diagram illustrating an exemplary 12-port PBC IBOD application that may be utilized in connection with seamless dual switching in a port bypass controller, in accordance with an embodiment of the invention. Referring to FIG. 12, there is shown FC-Cores 1202, 1204 and an FC IBOD interface block 1206. Each of the FC-Cores 1202, 1204 comprises 12 ports including ports 0-11. One port in each of the FC-Cores 1202, 1204 is utilized as an interface port which couples the FC-Cores 1202, 1204 to the FC-IBOD interface block 1206. In this regard, each of the FC-Cores 1202, 1204 may be adapted to handle a maximum of 11 hard disks since one port is utilized for the interface port.

FIG. 12 also illustrates the daisy chaining of 22 hard disks utilizing two (2) FC-Cores. In this regard, the ports in FC-Core 1202 are chained with PBC0 being the first port and PBC10 in FC-Core 1204 being the last port in the chain. PBC10 in FC-Core 1202 is coupled to PBC0 in FC-Core 1204 via the interface PBCs, namely PBC11 of FC-Core 1202 and PBC11 of FC-Core 1204. In operation, data from the FC IBOD interface 1206 may be transferred to PBC11 of FC-Core 1202, traverse ports PBC0 through PBC10 of FC-Core 1202, pass back through PBC11 of FC-Core 1202 and into PBC11 of FC-Core 1204, traverse PBC10 through PBC0 of FC-Core 1204 and pass back through PBC11 of FC-Core 1204 into the FC IBOD interface 1206.

In accordance with various embodiment of the invention, dual switching may be provided utilizing, for example, separate retimer and repeater working in unison and this may significantly improve latency for the ports of the FC-Core. In an aspect of the invention, the retimer may be optimized for maximum flexibility and the repeater may be optimized for low latency. Automatic multi-port bypass may also be provided in order to minimizing latency among the ports of the FC-Core. The flexible architecture provided by the FC-Core may facilitate the coexistence of a plurality of functions, for example, port bypass, multi-port bypass, loopback and continuous monitoring of incoming signals in a port bypass controller.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for seamless port bypass controller operation, the method comprising:

receiving an input signal at a first port of a port bypass controller;

selecting at least a second port coupled in a chain to said first port; and switching at least a portion of said received input signal from said first port to at least said second port, wherein said second port selects between said received input signal from said first port and a retimed signal corresponding to at least a portion of said received input signal for said second port.

2. The method according to claim 1, comprising repeating at least a portion of said received input signals to said at least said second port.

3. The method according to claim 1, comprising generating a retimed signal corresponding to at least a portion of said received input signal to said at least said second port.

4. The method according to claim 1, comprising acquiring timing data from said received input signal.

5. The method according to claim 4, comprising driving at least a transmit path of said at least said second port utilizing at least a portion of said acquired timing data from said received input signal.

6. The method according to claim 1, comprising:
bypassing at least one port in said chain; and
switching at least a portion of said received input signal from said first port to at least a third port coupled in said chain.

7. The method according to claim 1, comprising looping back at least a portion of said received input signal from said first port to a transmit path of said first port.

8. The method according to claim 1, comprising simultaneously generating said retimed signal corresponding to at least a portion of said received input signal for said second port while repeating at least a portion of said received input signal to a third port coupled in said chain.

9. The method according to claim 1, comprising bypassing all ports for a first FC-Core coupled in said chain and switching at least a portion of said received input signal to at least one ports in a second FC-Core coupled in said chain.

10. The method according to claim 1, comprising:
detecting a rate of said received input signal; and
aligning to word boundaries in said received input signal based on said detected rate of said received input signal.

11. A non-transitory computer-readable medium encoded with a computer program having stored thereon, a computer program having at least one code section for seamless port bypass controller operation, the at least one code section executable by a machine for causing the machine to perform steps comprising:
receiving an input signal at a first port of a port bypass controller;
selecting at least a second port coupled in a chain to said first port; and
switching at least a portion of said received input signal from said first port to at least said second port, wherein said second port selects between said received input signal from said first port and a retimed signal corresponding to at least a portion of said received input signal for said second port.

12. The non-transitory computer-readable medium encoded with a computer program according to claim 11, comprising code for repeating at least a portion of said received input signal to said at least said second port.

13. The non-transitory computer-readable medium encoded with a computer program according to claim 11, comprising code for generating a retimed signal corresponding to at least a portion of said received input signals to said at least said second port.

14. The non-transitory computer-readable medium encoded with a computer program according to claim 11, comprising code for acquiring timing data from said received input signal.

15. The non-transitory computer-readable medium encoded with a computer program according to claim 14, comprising code for driving at least a transmit path of said at least said second port utilizing at least a portion of said acquired timing data from said received input signal.

16. The non-transitory computer-readable medium encoded with a computer program according to claim 11, comprising:
code for bypassing at least one port in said chain; and
code for switching at least a portion of said received input signal from said first port to at least a third port coupled in said chain.

17. The non-transitory computer-readable medium encoded with a computer program according to claim 11, comprising code for looping back at least a portion of said received input signal from said first port to a transmit path of said first port.

18. The non-transitory computer-readable medium encoded with a computer program according to claim 11, comprising code for simultaneously generating said retimed signal corresponding to at least a portion of said received input signal for said second port while repeating at least a portion of said received input signal to a third port coupled in said chain.

19. The non-transitory computer-readable medium encoded with a computer program according to claim 11, comprising code for bypassing all ports for a first FC-Core coupled in said chain and switching at least a portion of said received input signal to at least one port in a second FC-Core coupled in said chain.

20. The non-transitory computer-readable medium encoded with a computer program according to claim 11, comprising:
code for detecting a rate of said received input signal; and
code for aligning to word boundaries in said received input signal based on said detected rate of said received input signal.

21. A system for seamless port bypass controller operation, the system comprising:
a first port of a port bypass controller that receives an input signal;
at least one selector that selects at least a second port coupled in a chain to said first port; and
said at least one selector switches at least a portion of said received input signal from said first port to at least said second port, wherein each of said second port selects between said received input signal from said first port and a retimed signal corresponding to at least a portion of said received input signal for said second port.

22. The system according to claim 21, comprising a repeater that repeats at least a portion of said received input signals to said at least said second port.

23. The system according to claim 21, comprising a retimer that generates a retimed signal corresponding to at least a portion of said received input signal to said at least said second port.

24. The system according to claim 21, comprising at least one of a CDR and an interpolator that acquires timing data from said received input signal.

25. The system according to claim 24, wherein said at least one of said CDR and said interpolator drives at least a transmit path of said at least said second port utilizing at least a portion of said acquired timing data from said received input signal.

26. The system according to claim 21, comprising:
- a bypass selector that bypasses at least one port in said chain; and
- said bypass selector switches at least a portion of said received input signal from said first port to at least a third port coupled in said chain.

27. The system according to claim 21, comprising a loopback selector that loopbacks at least a portion of said received input signal from said first port to a transmit path of said first port.

28. The system according to claim 21, comprising a retimer that simultaneously generates a retimed signal corresponding to at least a portion of said received input signal for said second port while a repeater repeats at least a portion of said received input signals to a third port coupled in said chain.

29. The system according to claim 21, comprising a bypass selector that bypasses all ports for a first FC-Core coupled in said chain and switches at least a portion of said received input signal to at least one port in a second FC-Core coupled in said chain.

30. The system according to claim 21, comprising:
- a speed detector that detects a rate of said received input signal; and
- a word synchronizer that aligns to word boundaries in said received input signal based on said rate of said received input signal detected by said speed detector.

* * * * *